US011638879B2

(12) United States Patent
Kuwatani et al.

(10) Patent No.: US 11,638,879 B2
(45) Date of Patent: May 2, 2023

(54) GAME PROCESSING SYSTEM, METHOD OF PROCESSING GAME, AND STORAGE MEDIUM STORING PROGRAM FOR PROCESSING GAME

(71) Applicant: Gree, Inc., Tokyo (JP)

(72) Inventors: Takashi Kuwatani, Tokyo (JP); Makoto Chida, Tokyo (JP)

(73) Assignee: GREE, Inc., Tokyo (JP)

( * ) Notice: Subject to any disclaimer, the term of this patent is extended or adjusted under 35 U.S.C. 154(b) by 37 days.

(21) Appl. No.: 17/488,901

(22) Filed: Sep. 29, 2021

(65) Prior Publication Data
US 2022/0016532 A1 Jan. 20, 2022

Related U.S. Application Data

(63) Continuation of application No. 16/922,459, filed on Jul. 7, 2020, now Pat. No. 11,161,047, which is a
(Continued)

(30) Foreign Application Priority Data

Feb. 6, 2018 (JP) .............................. JP2018-019001
Jul. 5, 2018 (JP) .............................. JP2018-128409
(Continued)

(51) Int. Cl.
*A63F 13/69* (2014.01)
*A63F 13/26* (2014.01)

(52) U.S. Cl.
CPC .............. *A63F 13/69* (2014.09); *A63F 13/26* (2014.09); *A63F 2300/8082* (2013.01)

(58) Field of Classification Search
CPC .......... A63F 13/26; A63F 13/69; A63F 13/87; A63F 2300/8082; A63F 2300/308;
(Continued)

(56) References Cited

U.S. PATENT DOCUMENTS

| 5,791,987 A | 8/1998 | Chen |
| 5,835,077 A * | 11/1998 | Dao ........................ G01P 15/18 |
| | | 345/157 |
| 5,927,714 A | 7/1999 | Kaplan |
| 6,213,873 B1 | 4/2001 | Gasper |
| 6,254,098 B1 | 7/2001 | Kirkpatrick |

(Continued)

FOREIGN PATENT DOCUMENTS

JP 2015-231443 A 12/2015

OTHER PUBLICATIONS

Notice of Reasons for Refusal dated Mar. 8, 2022 issued in corresponding Japanese Patent Application No. 2020-212003 with English translation (7 pgs.).
(Continued)

*Primary Examiner* — David L Lewis
*Assistant Examiner* — Matthew D Hoel
(74) *Attorney, Agent, or Firm* — Pillsbury Winthrop Shaw Pittman, LLP

(57) ABSTRACT

A game processing system for processing a game having a first mode and a second mode according to an aspect includes one or more computer processors. The one or more computer processors are configured to provide an interaction with a virtual character in the first mode and the second mode. In a switch process for switching the game from the first mode to the second mode, the one or more computer processors are configured to, start the second mode if a switch object is selected by a player of the game gazing at the switch object during a predetermined period of time since the switch object is displayed, and return to the first mode if the switch object is not selected during the predetermined period of time.

20 Claims, 15 Drawing Sheets

Related U.S. Application Data continuation of application No. 16/268,600, filed on Feb. 6, 2019, now Pat. No. 10,981,067.

(30) Foreign Application Priority Data

Jul. 6, 2018 (JP) .............................. JP2018-129484
Dec. 13, 2018 (JP) .............................. JP2018-233014

(58) Field of Classification Search
CPC .... A63F 13/52; A63F 13/525; A63F 13/5252; A63F 13/5255; A63F 13/5258; A63F 13/53

See application file for complete search history.

(56) References Cited

U.S. PATENT DOCUMENTS

| | | | |
|---|---|---|---|
| 6,585,264 B2 | 7/2003 | Bennett | |
| 6,916,247 B2 | 7/2005 | Gatto | |
| 7,410,418 B2 | 8/2008 | Potter | |
| 7,497,439 B2 | 3/2009 | Leupp | |
| 7,549,924 B2 | 6/2009 | Canessa | |
| 7,664,816 B2 | 2/2010 | Heron | |
| 7,828,661 B1 | 11/2010 | Fish | |
| 8,025,570 B2 | 9/2011 | Labrie | |
| 8,087,672 B2 | 1/2012 | Malobabic | |
| 8,109,820 B2 | 2/2012 | Nagel | |
| 8,250,476 B2 | 8/2012 | Hamilton, II | |
| 8,271,962 B2 | 9/2012 | Muller | |
| 8,272,961 B2 | 9/2012 | Busey | |
| 8,282,458 B2 | 10/2012 | Reynolds | |
| 8,303,416 B1 | 11/2012 | Thakkar | |
| 8,328,644 B2 | 12/2012 | Busey | |
| 8,342,967 B2 | 1/2013 | Thakkar | |
| 8,348,765 B1 | 1/2013 | Thakkar | |
| 8,357,405 B2 | 1/2013 | Schmitz | |
| 8,366,546 B1 | 2/2013 | Naik | |
| 8,379,540 B2 | 2/2013 | Gill | |
| 8,535,134 B2 | 9/2013 | Katz | |
| 8,579,108 B2 | 11/2013 | Bo | |
| 8,602,875 B2 | 12/2013 | Nguyen | |
| 8,622,828 B1 | 1/2014 | Harrington | |
| 8,636,583 B2 | 1/2014 | Bigelow, Jr. | |
| 8,734,243 B2 | 5/2014 | Harrington | |
| 8,754,905 B2 | 6/2014 | Mahajan | |
| 8,799,810 B1* | 8/2014 | Wheeler | G06F 3/012 348/208.99 |
| 8,821,297 B1 | 9/2014 | Nagata | |
| 8,834,277 B2 | 9/2014 | Perry | |
| 8,894,484 B2* | 11/2014 | Latta | A63F 13/65 463/36 |
| 8,986,116 B1 | 3/2015 | Harrington | |
| 9,168,454 B2* | 10/2015 | Manning | G07F 17/32 |
| 9,295,914 B2 | 3/2016 | Almog | |
| 9,305,328 B2 | 4/2016 | Mahajan | |
| 9,415,305 B2 | 8/2016 | Cudak | |
| 9,486,709 B1 | 11/2016 | Lan | |
| 9,533,217 B2 | 1/2017 | Naik | |
| 9,536,374 B2* | 1/2017 | Manning | G07F 17/3237 |
| 9,586,139 B2 | 3/2017 | Jabara | |
| 9,682,315 B1 | 6/2017 | Miller | |
| 9,682,324 B2 | 6/2017 | Bansi | |
| 9,703,369 B1* | 7/2017 | Mullen | A63F 13/843 |
| 9,744,448 B2* | 8/2017 | Mullen | A63F 13/00 |
| 9,746,921 B2* | 8/2017 | Mallinson | G06F 3/016 |
| 9,746,984 B2* | 8/2017 | Stafford | G06F 3/011 |
| 9,811,979 B2 | 11/2017 | Ma | |
| 9,895,609 B2 | 2/2018 | Miller | |
| 9,901,816 B2* | 2/2018 | Lee | A63F 13/212 |
| 9,968,849 B1 | 5/2018 | Lan | |
| 9,987,554 B2* | 6/2018 | Stafford | G06F 3/017 |
| 10,115,238 B2* | 10/2018 | Chen | G06Q 30/0267 |
| 10,231,612 B2* | 3/2019 | Nacouzi | A61B 1/00101 |
| 10,341,612 B2* | 7/2019 | Imaoka | G06Q 30/06 |
| 10,518,172 B2* | 12/2019 | Chen | A63F 13/235 |
| 10,981,052 B2 | 4/2021 | Kuwatani | |
| 10,981,067 B2* | 4/2021 | Kuwatani | A63F 13/87 |
| 11,083,959 B2* | 8/2021 | Kuwatani | A63F 13/212 |
| 11,090,557 B2* | 8/2021 | Downs | A63F 13/26 |
| 11,110,346 B2 | 9/2021 | Kuwatani | |
| 11,161,047 B2* | 11/2021 | Kuwatani | A63F 13/87 |
| 11,167,214 B1* | 11/2021 | White | G06N 3/006 |
| 11,247,128 B2* | 2/2022 | Wu | A63F 13/822 |
| 11,338,203 B2 | 5/2022 | Lan | |
| 2002/0086732 A1 | 7/2002 | Kirmse | |
| 2005/0086301 A1 | 4/2005 | Eichler | |
| 2005/0266925 A1 | 12/2005 | Hornell | |
| 2006/0030959 A1 | 2/2006 | Duhamel | |
| 2006/0258463 A1 | 11/2006 | Cugno | |
| 2007/0218997 A1 | 9/2007 | Cho | |
| 2007/0220108 A1* | 9/2007 | Whitaker | H04M 1/6041 709/217 |
| 2009/0149248 A1 | 6/2009 | Busey | |
| 2009/0181767 A1 | 7/2009 | Feng | |
| 2009/0208181 A1 | 8/2009 | Cottrell | |
| 2009/0240659 A1 | 9/2009 | Ganz | |
| 2009/0243218 A1 | 10/2009 | Schlumbrecht | |
| 2009/0297118 A1 | 12/2009 | Fink | |
| 2010/0035685 A1 | 2/2010 | Cha | |
| 2010/0160038 A1 | 6/2010 | Youm | |
| 2010/0182340 A1* | 7/2010 | Bachelder | G02B 27/017 345/633 |
| 2011/0028208 A1 | 2/2011 | Hodgetts | |
| 2011/0035684 A1* | 2/2011 | Lewis | A63F 13/335 715/753 |
| 2011/0087967 A1 | 4/2011 | Ganz | |
| 2012/0009997 A1 | 1/2012 | Youm | |
| 2012/0013622 A1 | 1/2012 | Mahajan | |
| 2012/0110455 A1 | 5/2012 | Sharma | |
| 2012/0134651 A1 | 5/2012 | Cottrell | |
| 2012/0178536 A1 | 7/2012 | Oh | |
| 2012/0278739 A1 | 11/2012 | McClarren | |
| 2013/0156137 A1 | 6/2013 | Higuchi | |
| 2013/0219299 A1 | 8/2013 | Yerli | |
| 2013/0316820 A1* | 11/2013 | Douglas | A63F 13/26 463/31 |
| 2014/0128147 A1 | 5/2014 | Yu Cheng | |
| 2014/0187314 A1 | 7/2014 | Perry | |
| 2014/0187315 A1 | 7/2014 | Perry | |
| 2014/0194207 A1 | 7/2014 | Yim | |
| 2014/0253568 A1 | 9/2014 | Mahajan | |
| 2014/0361956 A1* | 12/2014 | Mikhailov | G02B 27/0179 345/8 |
| 2015/0182858 A1* | 7/2015 | Angelici | A63F 13/54 463/35 |
| 2015/0260474 A1* | 9/2015 | Rublowsky | F41A 33/00 434/16 |
| 2015/0279079 A1* | 10/2015 | Wieczorek | A63F 13/00 345/473 |
| 2016/0093108 A1* | 3/2016 | Mao | G02B 27/017 345/633 |
| 2016/0232738 A1 | 8/2016 | Daly | |
| 2016/0246384 A1* | 8/2016 | Mullins | G06F 3/017 |
| 2016/0271487 A1* | 9/2016 | Crouse | A63F 1/00 |
| 2017/0076503 A1* | 3/2017 | Tamaoki | G06F 3/017 |
| 2017/0092235 A1* | 3/2017 | Osman | G06F 3/16 |
| 2017/0169658 A1* | 6/2017 | Froy | G07F 17/3206 |
| 2017/0182414 A1* | 6/2017 | Oishi | A63F 13/5255 |
| 2017/0269685 A1* | 9/2017 | Marks | A63F 13/533 |
| 2018/0229127 A1 | 8/2018 | Nahari | |
| 2018/0262717 A1* | 9/2018 | Imaoka | G06Q 50/10 |
| 2019/0240569 A1* | 8/2019 | Kuwatani | A63F 13/26 |
| 2019/0240570 A1* | 8/2019 | Kuwatani | A63F 13/5255 |
| 2019/0240582 A1* | 8/2019 | Kuwatani | A63F 13/87 |
| 2019/0243445 A1* | 8/2019 | Kuwatani | G06F 3/011 |
| 2020/0254337 A1* | 8/2020 | Kuwatani | H04L 51/04 |
| 2020/0330876 A1* | 10/2020 | Kuwatani | A63F 13/26 |

OTHER PUBLICATIONS

LayerQ "[Report] Alternative Girls, has a 3 d battle, and has the presence of Suspense", [online]Jul. 29, 2016, IID, Inc., Inner

(56) References Cited

OTHER PUBLICATIONS

Registry Games, [search on Feb. 22, 2022], Internet URL:https://www.inside—games.jp/article/2016/07/29/100697.html (7 pgs.).
Non-final Office Action dated Jul. 8, 2022, issued in corresponding U.S. Appl. No. 17/365,442 (18 pgs.).
Notice of Reasons for Refusal dated Jul. 26, 2022, issued in corresponding Japanese Patent Application No. 2021-109780 with English translation (7 pgs.).

* cited by examiner

GAME PROCESSING SYSTEM, METHOD OF PROCESSING GAME, AND STORAGE MEDIUM STORING PROGRAM FOR PROCESSING GAME

CROSS-REFERENCE TO RELATED APPLICATIONS

This application is a Continuation Application of U.S. Ser. No. 16/922,459 filed on Jul. 7, 2020, which is a Continuation Application of U.S. Ser. No. 16/268,600, now U.S. Pat. No. 10,981,067, and claims the benefit of priority from Japanese Patent Application Serial No. 2018-019001 (filed on Feb. 6, 2018), Japanese Patent Application Serial No. 2018-128409 (filed on Jul. 5, 2018), Japanese Patent Application Serial No. 2018-129484 (filed on Jul. 6, 2018) and Japanese Patent Application Serial No. 2018-233014 (filed on Dec. 13, 2018). The subject matter of each of the above applications is incorporated herein by reference in entirety.

TECHNICAL FIELD

The present disclosure relates to an application processing system for providing interaction with a virtual character, a method of processing an application, and a storage medium storing a program for processing an application. More specifically, the present disclosure relates to an application processing system for processing an application, a method of processing an application, and a storage medium storing a program for processing an application, the application being capable of providing interaction with a virtual character in accordance with detection information obtained by a head mounted display. One example of the application is a game. Therefore, the present disclosure relates to a game processing system for processing a game, a method of processing a game, and a storage medium storing a program for processing a game.

BACKGROUND

Examples of applications for providing interaction with a virtual character include simulation games that provide interaction with a virtual character. An example of these simulation games is disclosed in Japanese Patent Application Publication No. 2012-055644.

Games providing such interaction with a virtual character may utilize a head mounted display (hereinafter may be referred to as "HMD") in order to enhance player's sense of immersion in the games. For example, known is a VR game in which a virtual space is displayed on an HMD, and a player wearing the HMD can interact with a virtual character appearing in the virtual space. The game "SUMMER LESSON" from BANDAI NAMCO Entertainment Co., Ltd. is known as this type of VR game (see "Summer Lesson", [online], retrieved on 12, Dec. 2017, Internet (URL: HYPERLINK "http://summer-lesson.bn-ent.net/" http://summer-lesson.bn-ent.net/)).

As disclosed in Japanese Patent Application Publication No. 2017-058969, an HMD includes a tracking sensor for sensing the position and orientation of a head of a player. In VR games using an HMD, a viewpoint in a virtual space is set in accordance with detection information obtained by the tracking sensor, and an image of the virtual space as viewed from the viewpoint thus set is displayed on the HMD.

In the game "SUMMER LESSON," realized is a function of specifying an interaction with a virtual character depending on detection information obtained by a tracking sensor of the HMD and causing the player to experience the specified interaction.

For example, when the player wearing the HMD nods in response to a movement of an image of a virtual character displayed on the HMD, a motion of the player's head corresponding to the nodding is detected. Based on the detected motion of the head, an image of the virtual character that performs an action responding to the nodding of the player is displayed on the HMD.

In this way, a conventional VR game in which interaction with a virtual character is performed using the HMD, an image of a virtual space is displayed so as to follow a motion of a player's head, and the player experiences interaction with the virtual character in accordance with the motion of the head so that the player can obtain a strong sense of immersion.

To play a VR game, a player needs to wear an HMD on his/her head. At the present, an HMD is not used in a daily life, and an HMD worn on a head blocks a view in a real world. Therefore, some players have a feeling of resistance against wearing an HMD. Accordingly, a technical improvement is demanded for prompting a player starting a VR game to wear an HMD and/or for reducing a player's feeling of resistance related to wearing an HMD.

SUMMARY

It is an object of the present disclosure to provide a technical improvement which solves or alleviates at least part of the drawbacks of the prior art mentioned above.

A game processing system for processing a game having a first mode and a second mode according to an embodiment includes one or more computer processors. The one or more computer processors may execute computer-readable instructions to provide, in the first mode, an interaction with a virtual character in accordance with first detection information obtained by an information processing device not mounted on a head of a player. The one or more computer processors also performs a switch process from the first mode to the second mode and provide, in the second mode after the switch process, an interaction with the virtual character in accordance with second detection information obtained by a head mounted display mounted on the head of the player.

In the game processing system according to an embodiment, the interaction with the virtual character in the first mode includes that the virtual character prompts the player to switch to the second mode.

In an embodiment, the interaction with the virtual character in the first mode includes an interaction for selecting settings in the second mode.

In the game processing system according to an embodiment, the switch process is started in response to the interaction with the virtual character in the first mode.

In the game processing system according to an embodiment, the switch process is started by selecting a switch start object displayed on the information processing device in the first mode.

In the game processing system according to an embodiment, the switch process includes displaying, in response to selection of the switch start object, a guidance for prompting the player to put on the head mounted display on the information processing device.

In the game processing system according to an embodiment, the switch process includes switching to the second mode in response to selection of a switch object capable of being selected by the player gazing at the switch object.

In the game processing system according to an embodiment, the one or more computer processors causes the information processing device to display a login screen to start the first mode after the second mode is terminated.

In the game processing system according to an embodiment, the head mounted display includes an attachment to be fitted on the head of the player and the information processing device mounted on the attachment.

In the game processing system according to an embodiment, in the second mode, head tracking information for specifying a position and/or an orientation of the head of the player is calculated based on the second detection information, and the interaction with the virtual character is provided in accordance with the head tracking information.

In the game processing system according to an embodiment, in the second mode, the virtual character is displayed as a stereoscopic image, whereas in the first mode, the virtual character is displayed as a non-stereoscopic image.

In a game processing method according to an embodiment, one or more computer processors execute computer-readable instructions to process a game having a first mode and a second mode. The game processing method comprises: providing, in the first mode, an interaction with a virtual character in accordance with first detection information obtained by an information processing device not mounted on a head of a player; performing a switch process from the first mode to the second mode; and providing, in the second mode after the switch process, an interaction with the virtual character in accordance with second detection information obtained by a head mounted display mounted on the head of the player.

A non-transitory game processing program according to an embodiment stored in a computer-readable storage medium is executed by one or more computer processors for processing a game having a first mode and a second mode. The game processing program causes the one or more computer processors to: provide, in the first mode, an interaction with a virtual character in accordance with first detection information obtained by an information processing device not mounted on a head of a player; perform a switch process from the first mode to the second mode; and provide, in the second mode after the switch process, an interaction with the virtual character in accordance with second detection information obtained by a head mounted display mounted on the head of the player.

ADVANTAGES

According to the embodiments, it is possible to prompt a player to wear a head mounted display in the course of progress of a game in a first mode.

DESCRIPTION OF THE EMBODIMENTS

Figure 1:
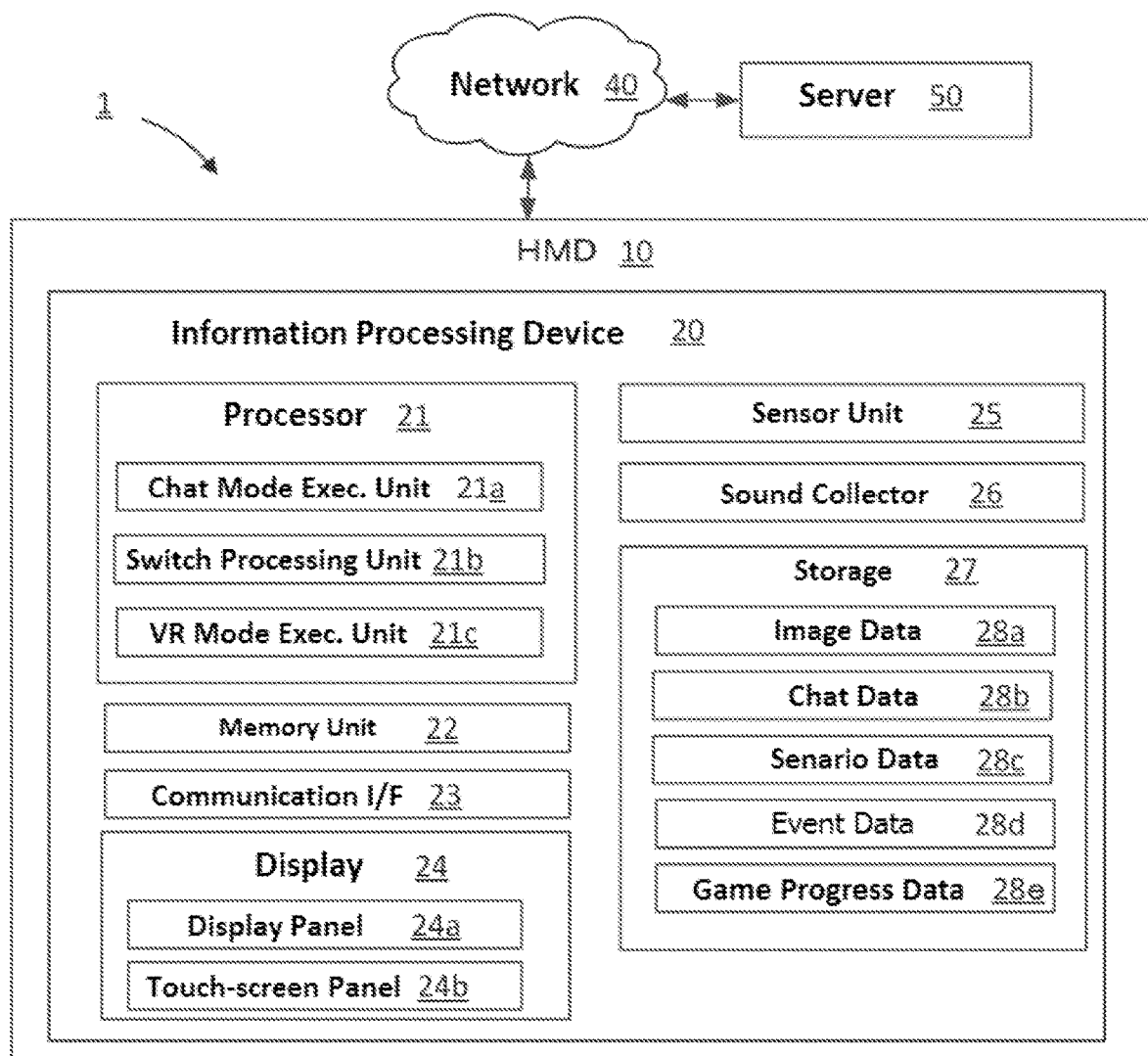
FIG. 1 is a block diagram illustrating a game processing system according to an embodiment.

Various embodiments of the disclosure will be described hereinafter with reference to the accompanying drawings. Throughout the drawings, the same or similar components are denoted by the same reference numerals.

Figure 2:
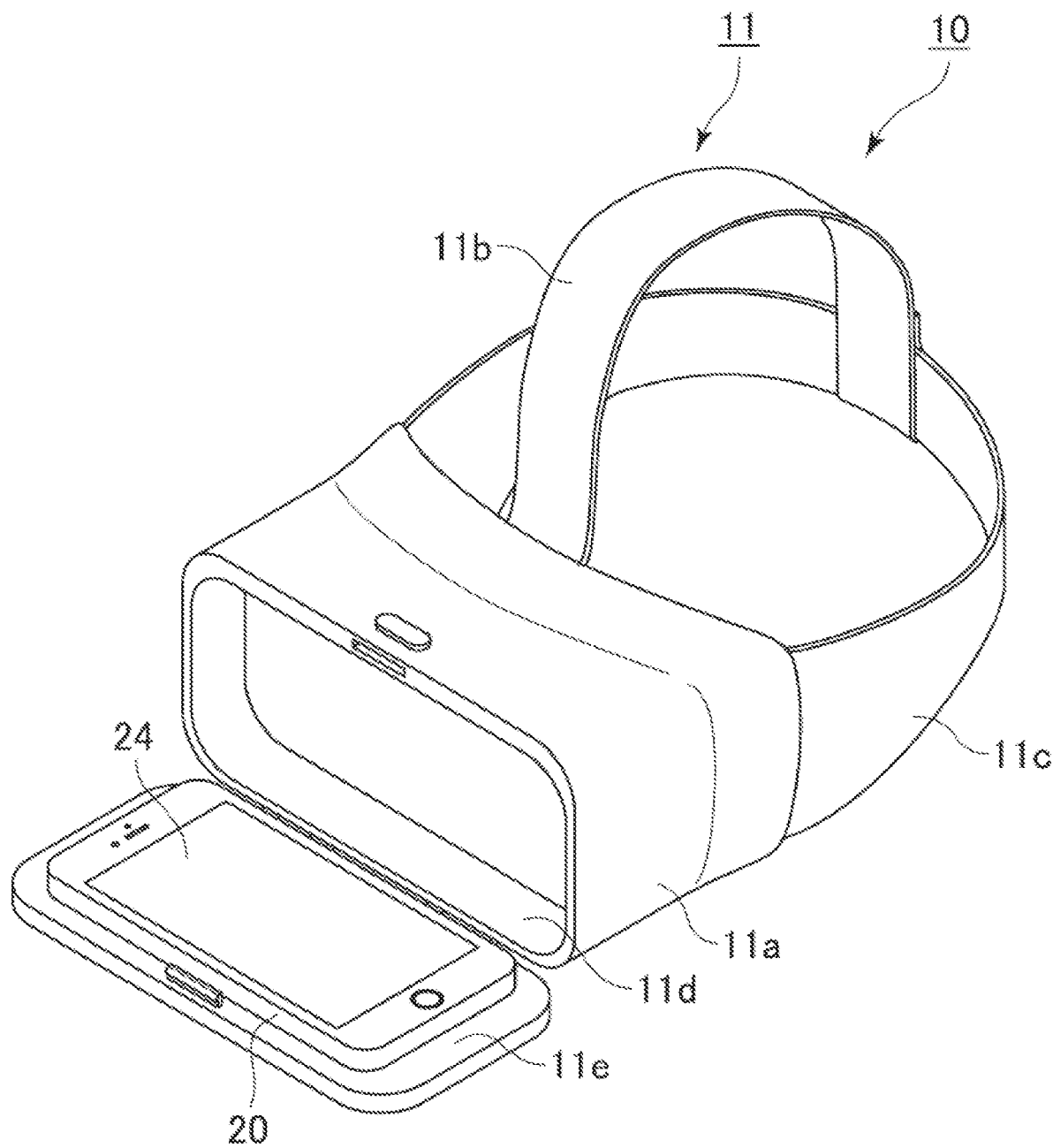
FIG. 2 is a schematic diagram showing a head mounted display usable in the game processing system of FIG. 1.
Figure 3:
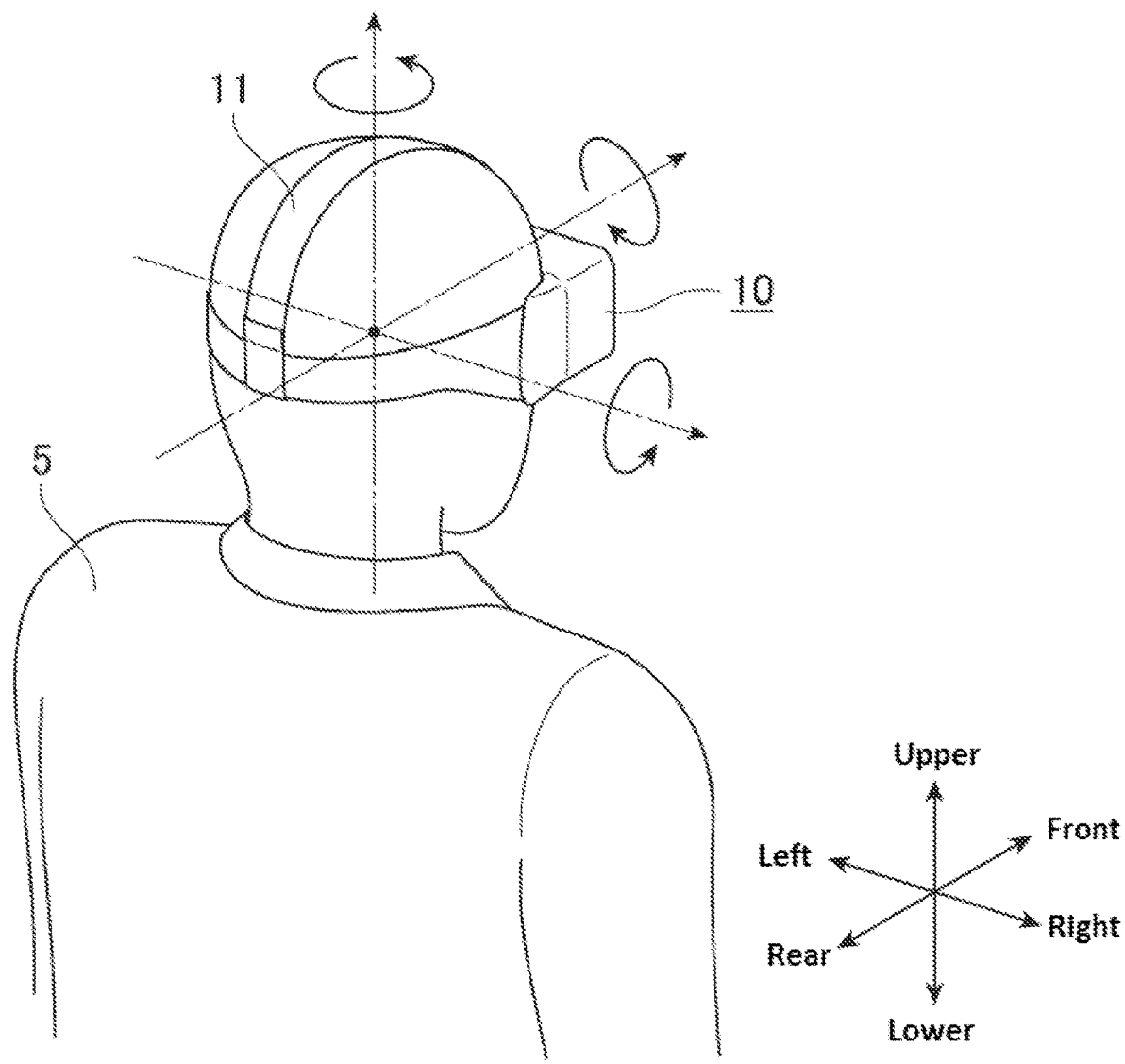
FIG. 3 is a diagram schematically showing the head mounted display worn by a player of the game.

With reference to FIGS. 1 to 3, a game processing system according to an embodiment of the disclosure will be described. FIG. 1 is a block diagram of a game processing system 1 according to an embodiment, FIG. 2 schematically illustrates a head mounted display 10 (hereinafter referred to as "HMD 10") used in the game processing system 1, and FIG. 3 schematically illustrates the HMD 10 worn by a player 5.

The game processing system may be configured to process an application other than games. The game processing system may be configured to provide an application for simulation in the field of driving or other fields, an application for training in the field of medicine or other fields, an application for experiencing produces and services, an application for appreciating films or other various entertainment contents, and other various applications.

The game processing system 1 according to an embodiment realizes various games by executing game processing programs according to an embodiment. Using the game processing system 1, the player is able to play various games. For example, the game processing system 1 can realize a game in which a virtual character and the player interact in a virtual space. The game realized by the game processing system 1 has a first mode and a second mode. The same game contents may be used in the first mode and the second mode. Game contents are electronic data that are used in a game realized by the game processing system 1 and can be acquired, owned, used, managed, exchanged, integrated, reinforced, sold, abandoned, or donated in the game by users. The game contents may be, for example, a card, an item, a virtual currency, a ticket, a character, an avatar, level information, status information, parameter information (health, attack, and the like), capacity information, skills, abilities, magic and jobs, and any other various electronic data usable in the game. However, the types of game contents usable in the game processing system 1 and the way the game contents are used may not be limited to those described in this specification. An example of the first mode is a chat mode, and an example of the second mode is a VR mode. The first mode and the second mode will be described later.

The game processing system 1 includes the HMD 10 and a server 50. The HMD 10 and the server 50 are communicably interconnected over a network 40.

As shown in FIG. 2, the HMD 10 includes an attachment 11 that is to be fitted on a human head and an information processing device 20 attached to the attachment 11.

The attachment 11 includes a goggle-like casing 11a having an opening 11d formed therein, a first belt 11b and a second belt 11c attached to the casing 11a, and a cover 11e. The cover 11e is attached to the casing 11a such that it is openable and closable. An opening 11d is formed in a front portion of the casing 11a. FIG. 2 shows the state where the cover 11e is open. When the HMD 10 is used, the cover 11e is closed so as to close the opening lid.

The information processing device 20 is detachably provided on an inner side of the cover 11e of the HMD 10. The information processing device 20 includes a display 24. The information processing device 20 is attached to the cover 11e such that the display 24 faces the inside of the casing 11a when the cover 11e is closed. The information processing device 20 is attached to the attachment 11 when the HMD 10 is used. When the HMD 10 is not used, the information processing device 20 is detached from the attachment 11.

In the illustrated embodiment, the information processing device 20 is a smartphone. In addition to the smartphone, the information processing device 20 may be a mobile phone, a tablet, a personal computer, an electronic book reader, a wearable computer, a game console, or any other information processing devices. When detached from the HMD 10, the information processing device 20 may be used for its originally intended purpose.

The information processing device 20 includes the display 24 as described above. In the illustrated embodiment, when the information processing device 20 is mounted on the attachment 11, the display 24 serves as an apparatus for displaying an image in the HMD 10. Accordingly, when the HMD 10 is used to play a game, the display 24 displays a virtual space and a virtual character(s) of the game, and other images related to the game.

The shape of the attachment 11 is not limited to the illustrated goggle type. The attachment 11 may include a structure of any shape that moves following the movement of the head of the player who wears the HMD, and the structure can place the display 24 in front of the wearer's eye(s) while the HMD is worn. For example, the attachment 11 may have an eyeglasses-like shape, a hat-like shape, or a helmet-like shape. In order to enhance player's sense of immersion, the HMD 10 is preferably configured such that the display 24 covers both eyes of the player when the attachment 11 is attached to the head of the player.

When the HMD 10 is used, the HMD 10 is mounted on the head of the player 5 via the attachment 11, as shown in FIG. 3. The information processing device 20 is mounted on the attachment 11 attached to the head of the player 5.

The information processing device 20 will be further described referring again to FIG. 1. As illustrated, in one embodiment, the information processing device 20 includes a computer processor 21, a memory unit 22, a communication I/F 23, a display 24, a sensor unit 25, a sound collector 26, and a storage 27.

The computer processor 21 is a computing device which loads various programs realizing an operating system and game logics from the storage 27 or other storage into the memory unit 22 and executes instructions included in the loaded programs. The computer processor 21 is, for example, a CPU, an MCU, an FRPG, or any other computing devices. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or executed by a plurality of computer processors distributively. Further, a program or instructions included in the program executed by the computer processor 21 may be executed by a plurality of virtual computer processors.

The memory unit 22 is used to store instructions that may be executed by the computer processor 21 and other various data. At least a part of the game processing program in the embodiment is loaded into the memory unit 22 at appropriate timings in accordance with the progress of the game. The memory unit 22 is, for example, a main storage device (main memory) that the computer processor 21 is able to access at high speed. The memory unit 22 may be, for example, a RAM such as a DRAM or an SRAM.

The communication I/F 23 may be implemented as hardware, firmware, or communication software such as a TCP/IP driver or a PPP driver, or a combination thereof. The information processing device 20 is able to transmit and receive data to and from other devices via the communication I/F 23.

The display 24 includes a display panel 24a and a touch-screen panel 24b. For example, the display panel 24a is laminated on an upper surface or lower surface thereof with the touch-screen panel 24b. The display panel 24a is a liquid crystal panel, an organic EL panel, an inorganic EL panel, or any other display panel capable of displaying an image. The touch-screen panel 24b is configured to detect touch operations performed by the player. The touch-screen panel 24b can detect various touch operations such as tapping, double tapping, and dragging performed by the player.

The sensor unit 25 includes one or more sensors. The sensor unit 25 includes, for example, at least one selected from the group consisting of a gyro sensor, an acceleration sensor, and a geomagnetic sensor. The sensor unit 25 may include an eye tracking sensor that directly detects player's eye movements. The eye tracking sensor is, for example, an eye-gaze tracking sensor that emits a near-infrared light beam into the iris and detects its reflected light. The position and/or the direction of the head of the player 5 wearing the HMD 10 are specified based on detection information obtained by the sensor unit 25 as described later. At least some of the various sensors included in the sensor unit 25 may be mounted on the attachment 11 and/or a member other than the attachment 11 different from the information processing device 20.

The sound collector 26 is capable of collecting sound and voice. The sound collector 26 is, for example, a microphone. Sound and voice of the player 5 is detected based on audio information collected by the sound collector 26.

The storage 27 is an external storage device accessed by the computer processor 21. The storage 27 is, for example, a magnetic disk, an optical disk, or a semiconductor memory. Various programs such as a game processing program are stored in the storage 27. The storage 27 may also store various data used in a game(s). At least some of the programs and various data that can be stored in the storage 27 may be stored in a storage that is physically separated from the information processing device 20.

In the illustrated embodiment, the storage 27 stores image data 28a, chat data 28b, scenario data 28c, event data 28d, game progress data 28e, and various other data necessary for progress of the game.

The image data 28a includes data for drawing a background in a virtual space where a game is executed, data for drawing a virtual character, and data for drawing an object other than the virtual character used in the game. The image data 28a may include information about the position of an object in the virtual space.

The chat data 28b includes data for drawing an icon of a virtual character, data for drawing an icon of the player 5, data for specifying a plurality of messages from a virtual character, data representing options of a response message to the plurality of messages from the virtual character, and any other data used in the chat. The plurality of messages from the virtual character may be defined in a tree structure in which nodes corresponding to each message are interconnected by arcs. In the tree structure, for example, more than one arc extends from a start message which is the root node existing at the top, and each arc is connected to a node situated at a lower level. Arcs also extend from the lower nodes and are connected to nodes at a further lower level. The nodes at the lower levels each correspond to a possible message from a virtual character that may be displayed after the start message. The chat data 28b may include a mode switch condition that is a condition for starting a mode switch from the chat mode to the VR mode. The mode switch condition may include, for example, that the elapsed time since the game was started in the chat mode is equal to or longer than a predetermined length of time, that a chat has progressed to a terminal node of messages having the tree structure, and any other conditions. The chat data 28b may include data indicating a message that is to be displayed when the chat mode is resumed after selection of a switch object is not completed.

The scenario data 28c includes data defining a scenario to be experienced by the player 5 in the game. When there are two or more scenarios to be experienced by the player 5 in the game, the scenario data 28c may be defined for each of the scenarios. The scenario data 28c may be defined as a collection of events. The events included in the scenario data 28c may be defined in a tree structure in which nodes corresponding to each event are interconnected by arcs. In the tree structure, for example, more than one arc extends from a start event which is the root node existing at the top, and each arc is connected to a node situated at a lower level. Arcs also extend from the lower nodes and are connected to nodes at a further lower level. The nodes at the lower levels in a scenario each correspond to a possible event that may occur after the start event in the scenario.

The event data 28d define events constituting the scenario data 28c. The event data 28d may be defined as a collection of data for specifying a plurality of actions of a virtual character in a game. The plurality of actions of a virtual character may be defined in a tree structure in which nodes corresponding to each action are interconnected by arcs. In the tree structure, for example, more than one arc extends from a start action which is the root node existing at the top, and each arc is connected to a node situated at a lower level.

Arcs also extend from the lower nodes and are connected to nodes at a further lower level. The nodes at the lower levels in an event each correspond to a possible action that may occur after the start action in the event. The event data 28d may include, for each node, video image data that corresponds to the action corresponding to the node, data related to actions that may be performed toward a virtual character by the player, and other data related to actions of a virtual character.

The game progress data 28e includes data used for managing the progress of the game. The game progress data 28e may be updated as the game progresses. The game progress data 28e may include, for example, data related to likability of a virtual character to a player, data related to points acquired by the player in the game, and any other various types of data that may vary depending on the progress of the game.

The components and functions of the information processing device 20 shown in FIG. 1 are examples. The information processing device 20 applicable to the invention may include various components that are not shown. For example, the information processing device 20 may be provided with a speaker for outputting sound effect of the game and sound and voice of the virtual character.

Next, functions of the HMD 10 will be described. In the illustrated embodiment, various functions of the HMD 10 are realized by the computer processor 21 of the information processing device 20 executing computer readable instructions. The instructions executed by the computer processor 21 include instructions included in the game processing program according to an embodiment.

When the game processing program according to the embodiment is executed by the computer processor 21, the game having the first mode and the second mode different from the first mode is realized in the game processing system 1. The game realized in the game processing system 1 may further have a mode other than the first mode and the second mode.

In the first mode of the game realized in the game processing system 1, processing relating to an application is performed based on first detection information obtained by the information processing device 20 when the HMD 10 is not attached to the player 5, that is, when the information processing device 20 is detached from the attachment 11. For example, in the case where the application is a game, processing relating to the game is performed based on the first detection information obtained by the information processing device 20. The first detection information may include information concerning a touch operation of the player 5 detected via the touch-screen panel 24b of the information processing device 20, information concerning voice of the player detected by the sound collector 26, and any other detection information that can be detected in the information processing device 20 when the HMD 10 is not attached to the player 5. In the first mode, the player 5 is able to perform operations relating to the game using the information processing device 20 that is removed from the attachment 11. Since the first mode is designed such that the game is played when the HMD 10 is not mounted on the player 5, the display 24 displays, in an embodiment, a non-stereoscopic image.

In the second mode of the game realized in the game processing system 1, the processing related to the application is performed using second detection information obtained by the HMD 10 attached to the head of the player 5. For example, in the case where the application is a game, processing relating to the game is performed based on the second detection information obtained by the HMD 10. The second detection information is, for example, detection information obtained by the sensor unit 25. Based on the second detection information, head tracking information for determining the position and/or the orientation of the head of the player 5 is calculated. A process for advancing the game in the second mode may be performed based on, for example, the head tracking information calculated based on the second detection information. The process for advancing the game in the second mode may be performed using any other information in addition to the head tracking information. In preparation for playing the game in the second mode, the player 5 attaches the information processing device 20 to the attachment 11, and places the attachment 11 with the information processing device 20 on his/her head. As described above, the second mode is designed such that the game is played while the HMD 10 is worn by the player 5, so in one embodiment, a stereoscopic image that is stereoscopically viewed by the player 5 is displayed on the display 24 in the second mode. The stereoscopic image is displayed on the display 24 by, for example, a parallax barrier method. In the parallax barrier method, a left eye image and a right eye image are displayed on the display 24. The stereoscopic image is a set of images including the left eye image and the right eye image configured to be stereoscopically viewed when displayed on the display utilizing the parallax of the left and right eyes.

The first mode is, for example, a chat mode. The chat mode is an example of the first mode. The chat mode provides a function that allows the player to chat with a virtual character via a text message. In the first mode, the player can experience interaction with a virtual character by chatting with the virtual character. Here, the interaction means, in a broad sense, that the virtual character reacts to an action/motion made by the player. The interaction with the virtual character includes an interaction performed as communication with the virtual character such as conversation with the virtual character. In this specification, an interaction performed as communication with a virtual character may also be referred to as a communicative interaction.

In addition to the communicative interaction, the interaction with a virtual character may include a battle against the virtual character, a cooperative play to play the game in cooperation with the virtual character, and other interactions with a virtual character. In this specification, an interaction performed as a battle against a virtual character may be referred to as a battle interaction. In the specification, an interaction performed as a cooperative play with a virtual character may be referred to as a cooperative interaction. Processes performed in the chat mode will be described later in detail. In the first mode, a method other than a chat may be used to provide an interaction with a virtual character. In the first mode, an interaction with a virtual character may be provided via email, telephone, video call, or other means.

The second mode is, for example, the VR mode. The VR mode provides a function that allows the player to perform various interactions with a virtual character appearing in the virtual space displayed on the display of the information processing device 20. Processes performed in the VR mode will be described later in detail. The VR mode is an example of the second mode, and the second mode may include any game mode in which a process for advancing the game is performed using the head tracking information.

In one embodiment, a game having the first mode and the second mode that is realized by the game processing system 1, may be a game in which a player performs interactions with a virtual character other than the communicative interaction. In the game realized by the game processing system 1, the communicative interaction may not be performed. The game according to one embodiment is played in a two-dimensional space in the first mode and played in a three-dimensional space in the second mode. The game according to one embodiment is played in a three-dimensional space in the first mode, whereas in the second mode, the game is played in a three-dimensional space displayed in a different manner than the three-dimensional space of the first mode (or in a three-dimensional space configured in a different manner than the three-dimensional space of the first mode). In one embodiment, the game realized by the game processing system 1 may use a game content(s) common to the first mode and the second mode. A parameter associated with the game content may be carried over to/from the first mode from/to the second mode. For example, when a value of the parameter of the specific game content is changed during playing the game in the first mode and thereafter the game switches to the second mode, the specific game content with the changed parameter is used in the second mode. In one embodiment, a value of a parameter of a specific game content may be changed when the game is switched from the first mode to the second mode and/or when the game is switched from the second mode to the first mode. The parameter change of the game content may be a change that is advantageous for the player 5 to advance the game or may be a change that is disadvantageous for the player 5. In one embodiment, a game play result in the first mode may be reflected in the game played in the second mode, and a play result in the second mode may be reflected in the game played in the first mode. For example, experience points of the player 5 acquired in the first mode may be carried over to the second mode.

As described above, the first mode and the second mode of the game realized in the game processing system 1 are distinguished from each other. That is, the first mode is different from the second mode. In one embodiment, when the game implemented in the game processing system 1 is played in the first mode, the HMD 10 is not attached to the head of the player 5, whereas when the game is played in the second mode, the HMD 10 is attached to the head of the player 5. In the first mode, the game is processed based on the first detection information obtained by the information processing device 20 that is not attached to the head of the player 5, whereas in the second mode, the game is processed based on the second detection information obtained by the HMD 10 that is attached to the head of the player 5.

In one embodiment, a stereoscopic image is displayed on the display 24 in the second mode, whereas in the first mode, a non-stereoscopic image is displayed on the display 24 as described above. At least an image of a virtual character among the images used in the game is displayed as a stereoscopic image in the second mode, whereas in the first mode, the image of the virtual character is displayed as an image other than the stereoscopic image.

In one embodiment, a process of advancing the game in the first mode is performed without using the head tracking information calculated based on the second detection information, whereas in the second mode, a process of advancing the game is performed based on the head tracking information.

In one embodiment, the process of advancing the game in the first mode is performed in accordance with a touch operation detected via the touch-screen panel 24*b*, whereas in the second mode, the process is not performed in accordance with the touch operation on the touch-screen panel 24b. In another embodiment, a process in the second mode may be performed in accordance with a touch operation on the touch-screen panel 24b.

In one embodiment, in the case where an interaction with a virtual character is provided in a game implemented in the game processing system 1, the interaction with the virtual character is provided based on the first detection information obtained by the information processing device 20 that is not attached to the head of the player 5 in the first mode. In the second mode, the interaction with the virtual character is provided based on the second detection information obtained by the HMD 10 attached to the head of the player 5.

Figure 4:
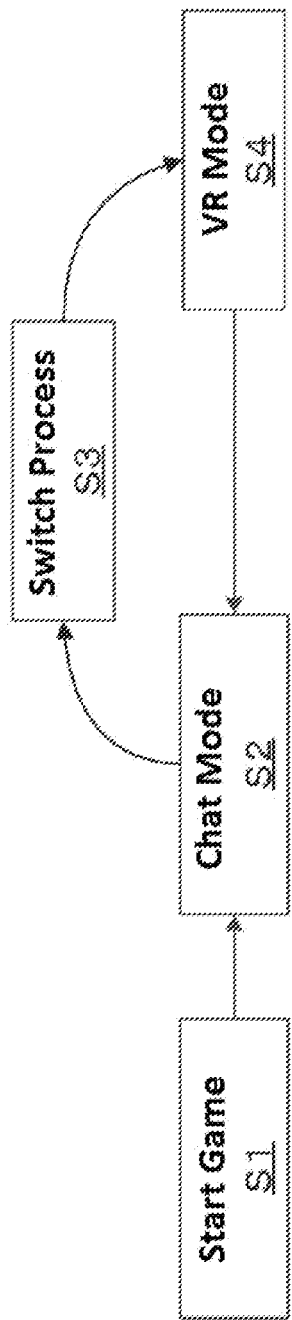
FIG. 4 is a diagram illustrating a mode switch in the game processed by the game processing system according to an embodiment.
Figure 5:
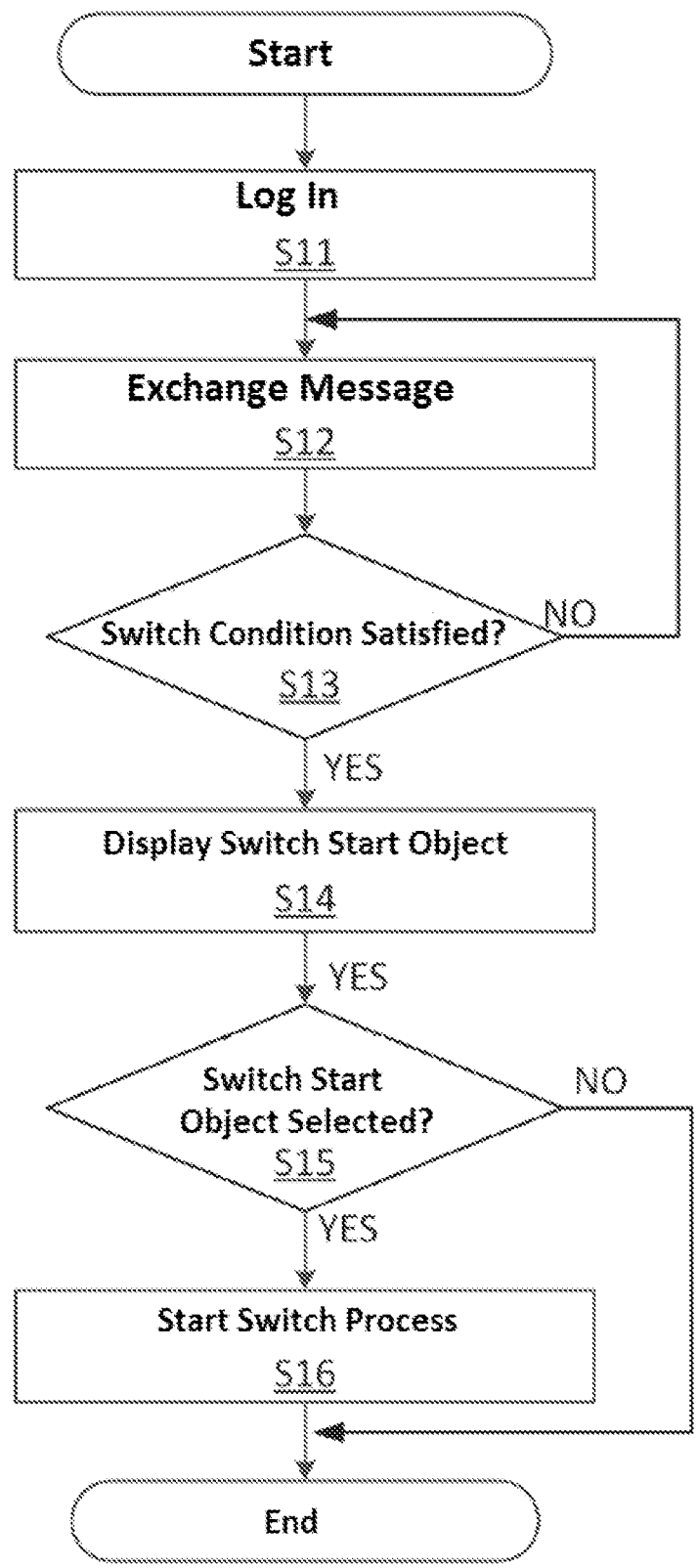
FIG. 5 is a flowchart of a process in a chat mode according to an embodiment.

After the game is started, it is possible to switch between the first mode and the second mode which are distinguished as described above. With reference to FIG. 4, the outline of the mode switch of the game processed by the game processing system 1 will be described. As shown in FIG. 5, when the game is started in step S1, the chat mode, which is the first mode, is started in step S2. In this chat mode, upon start of a switching process for switching to the VR mode which is the second mode, the process shifts to step S3 and the switching process to the second mode is carried out. When the switching process is completed, the VR mode, which is the second mode, is started in step S4. When the VR mode is terminated or interrupted, a return process to the chat mode is performed.

Functions realized by the computer processor 21 will be now described more specifically. The computer processor 21 functions as a chat mode execution unit 21a, a switch processing unit 21b, and a VR mode execution unit 21c by executing computer readable instructions. At least some of the functions that can be realized by the computer processor 21 may be realized by a computer processor other than the computer processor 21 of the game system 1. For example, at least some of the functions realized by the computer processor 21 may be realized by a computer processor mounted on the server 50.

The chat mode execution unit 21a performs processing for providing the game in the chat mode as the first mode by executing a game processing program according to an embodiment. The chat mode executing unit 21a implements a function that allows the player 5 to chat with a virtual character. After the player 5 logs in to the chat mode, the chat mode execution unit 21a displays a message from the virtual character and a message input or selected by the player 5 on the display 24, and enables the player 5 to chat with the virtual character. Following the message from the virtual character, the chat mode execution unit 21a may display on the display 24 several response options for the player 5 to respond to the message. One option is specified from the response options in accordance with an operation of the player 5, and a message corresponding to the specified response option is displayed as a message from the player 5 following the message from the virtual character. The player 5 can select a desired one from the displayed response options by touching the touch-screen panel 24b. The message from the virtual character and the response options for the player to respond to the message can be specified by referring to the chat data 28b in accordance with the game processing program. The message from the virtual character may be displayed together with an image of the virtual character, and the message from the player 5 may be displayed together with an image of the player 5. The message from the virtual character may include a message for prompting the player to switch to the VR mode which is the second mode, a message for allowing the player 5 to select an option(s) for setting of the VR mode, and any other message associated with the VR mode.

In an embodiment, in the chat mode, a switch start object for starting switching to the VR mode as the second mode is displayed in accordance with the progress of the chat. Display of the switch start object is performed in accordance with the game processing program when the mode switch condition is satisfied. The chat mode execution unit 21a is capable of detecting that the switch start object is selected based on a detection signal from the touch-screen panel 24b or any other user interface. When it is detected that the switch start object has been selected, the process for switching to the VR mode, which is the second mode, is started. In another embodiment, in the first mode, the switch process is started by a method other than selection of the switch start object. For example, the switch process may be started when the condition for starting a switch process is satisfied in the first mode, when a specific operation of a controller (a device other than the information processing device 20) that can be operated by the player 5 is detected, when the voice uttered by the player 5 is recognized, and/or when an instruction from the player 5 is recognized in other ways.

The switch processing unit 21b performs the process for switching from the first mode to the second mode. The switch process may include displaying a guidance on the display 24 to prompt a player to attach the information processing device 20 to the attachment 11, and displaying the switch object on the display 24 such that it is selectable by the player's gazing. After displaying the switch object, the switch processing unit 21b receives a detection signal from the sensor unit 25 or another sensor and determines whether the switch object has been selected by gazing based on the detection signal. For the determination, the switch processing unit 21b calculates the position and/or the orientation of the HMD 10 based on the detection signal from the sensor unit 25, and specifies the position (point) at which the player 5 gazes based on the calculated position and/or orientation of the HMD 10. The gazing point can be specified by various known methods. For example, the gazing point may be specified to be the central portion of the stereoscopic image displayed based on the second detection information. Alternatively, the gazing point may be specified based on the detection signal of the eye tracking sensor. For example, the switch processing unit 21b measures the duration of time (gazing duration) during which the gazing point is on the switch object, and when the gazing duration reaches a predetermined length, the switch processing unit 21b determines that the selection of the switch object has been completed. After the switch processing unit 21b determines that the selection of the switch object has been completed, it starts the VR mode which is the second mode. In another embodiment, the switch to the second mode may be performed by a method other than selection of the switch object. For example, the switch process may be performed when a specific operation of a controller (a device other than the information processing device 20) that can be operated by the player 5 is detected, when the voice uttered by the player 5 is recognized, and/or when an instruction from the player 5 is recognized in other ways. The switch object may be selected by a method different than the switch start object. For example, the switch start object is selected by an operation of the touch-screen panel 24b, and the switch object is selected by gazing of the player.

The VR mode execution unit 21c calculates the head tracking information for determining the position and/or the orientation of the HMD 10 based on the detection signal from the sensor unit 25 and specifies the position and/or the orientation of the HMD 10 based on the calculated head tracking information. The VR mode execution unit 21c generates a virtual space depending on the determined position and/or orientation of the HMD 10 and outputs image information for depicting the virtual space to the display 24. For example, the VR mode execution unit 21c calculates the gazing point based on the position and/or the orientation of the HMD 10 and generates the image information for a region of the entire virtual space determined by an angle of view and centered at the specified gazing point. Based on the image information generated in this way, the image for the region of the virtual space is displayed on the display 24. For the generation of the image information, for example, the image data 28a, the scenario data 28c, the event data 28d, the game progress data 28e, and other data stored in the storage 27 may be used.

The VR mode execution unit 21c displays an image of the virtual character in the virtual space in accordance with the game processing program and realizes interactions between the virtual character and the player 5. The VR mode execution unit 21c determines an action of the virtual character in the virtual space in accordance with the game processing program and generates image information and audio information corresponding to the action of the virtual character. The image information is output to the display 24, and the audio information is output to the speaker of the HMD 10. Thus, a motion image in which a virtual character moves in the virtual space is displayed on the display 24, and voice and sound corresponding to the movement of the virtual character are output from the speaker. For example, when the virtual character speaks to the player 5, a motion image in which the head and mouth of the virtual character move is displayed on the display 24, and voice corresponding to words which the virtual character speaks is output from the speaker. For the generation of the image information and the audio information corresponding to the action of the virtual character, for example, the image data 28a, the scenario data 28c, the event data 28d, the game progress data 28e, and other data stored in the storage 27 may be used. In one embodiment, the player 5 interacts with the same virtual character in the VR mode and the chat mode. For example, a virtual character appearing in the VR mode has the same name as a virtual character appearing in the chat mode, and they have common appearance such that they can be recognized as the same character. It should be noted that the image of the virtual character is displayed as a stereoscopic image in the VR mode whereas the image of the virtual character is displayed as a non-stereoscopic image in the chat mode, so that the images of the virtual character are different between the VR mode and the chat mode. However, such difference in representation format does not affect the identity of virtual characters.

Further, the VR mode execution unit 21c may specify an action of the player 5 using the HMD 10 based on the detection signal from the sensor unit 25, and determine an action (reaction) of the virtual character in the virtual space in accordance with the specified action. The actions of the player 5 wearing the HMD 10 include nodding, shaking his/her head, any other actions accompanied by motions of the head, and eye movements. The actions accompanied by motions of the head are calculated based on the detection information from the sensor unit 25. More specifically, the position and/or orientation of the HMD 10 mounted on the head is calculated as the position in the three-dimensional orthogonal coordinate system and the angle around each axis. The three-dimensional orthogonal coordinate system is, for example, an orthogonal coordinate system composed of a roll axis along the front-rear direction, a yaw axis along the vertical direction, and a pitch axis along the left-right direction. The action of the player 5 that causes the virtual character to make a reaction may include the player's eye movement. Such eye movement can be detected by the eye tracking sensor included in the sensor unit 25. The VR mode execution unit 21c generates image information for displaying the action of the virtual character determined in accordance with the action of the player 5 and outputs the generated image information as a stereoscopic image to the display 24. Thus, an image of the virtual character performing the action specified in accordance with the action of the player 5 is displayed on the display 24. In this way, the VR mode execution unit 21c determines the action of the virtual character in accordance with the action of the head or eye movement of the player 5 detected by the HMD 10 and causes the image information of the virtual character corresponding to the determined action to be displayed on the display 24. As described above, in the second mode, an interaction is realized between the player 5 and the virtual character displayed as a stereoscopic image.

When a termination condition is satisfied, the VR mode execution unit 21c performs a termination process to end the VR mode. The termination condition may include, for example, that a predetermined duration of time (for example, one minute) has elapsed from the start of the VR mode, that an operation for termination has been detected, that the last event included in the scenario being executed in the VR mode has ended, and any other conditions. The termination process performed when the termination condition is satisfied may include, displaying, on the display 24, a guidance for prompting the player to remove the information processing device 20 from the attachment 11, and displaying a login screen to log in to the chat mode which is the first mode.

Next, with reference to FIGS. 5 to 9, a chat process in the chat mode will be described. FIG. 5 is a flowchart showing the flow of the process in the chat mode in one embodiment, and FIGS. 6 to 9 show examples of a display image in the chat mode. It is assumed that the HMD 10 is not mounted on the head of the player 5 and the information processing device 20 is detached from the attachment 11 at the start of the chat mode.

In the game processing system 1, the game is started in the chat mode. In step S11, a login screen for logging in to the chat mode is displayed on the display 24 of the information processing device 20. When the login process is performed by the player 5, the chat process proceeds to step S12.

Figure 6:
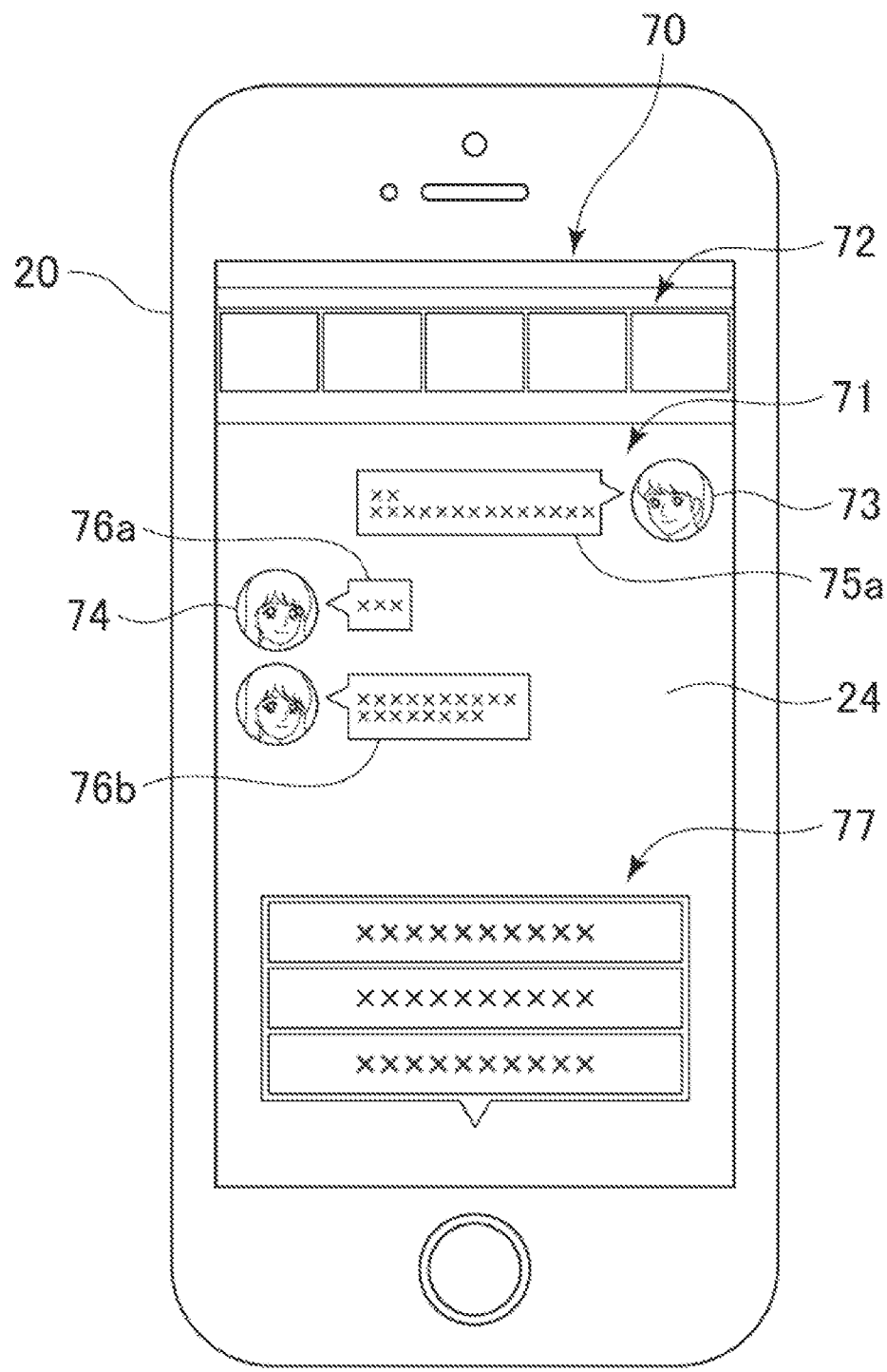
FIG. 6 shows an example of a display image in the chat mode according to an embodiment. The screen of FIG. 6 shows options of a message that the player is able to select.

In step S12, the player 5 and the virtual character exchange messages thereby to perform a chat therebetween. After logging into the chat mode, a chat display image for displaying a chat performed between the player 5 and the virtual character is generated, and the chat display image is displayed on the display 24. FIG. 6 shows a chat display image 70 which is an example of the chat display image displayed on the display 24. The chat display image 70 has a chat display area 71 including an icon 73 corresponding to the player 5, an icon 74 corresponding to the virtual character, a message 75a from the player 5, and messages 76a and 76b from the virtual character. In addition, the chat display image 70 has a menu area 72 arranged at the top of the chat display area 71. The virtual character's messages 76a and 76b are specified based on the chat data 28b and other data stored in the storage 72 in accordance with the game processing program. For example, messages of the virtual character are displayed sequentially from the message in the root node with reference to the chat data 28b defined in the form of the tree structure. At the branch point of nodes, a node is selected depending on a branch condition and a message corresponding to the selected node is displayed.

Figure 7:
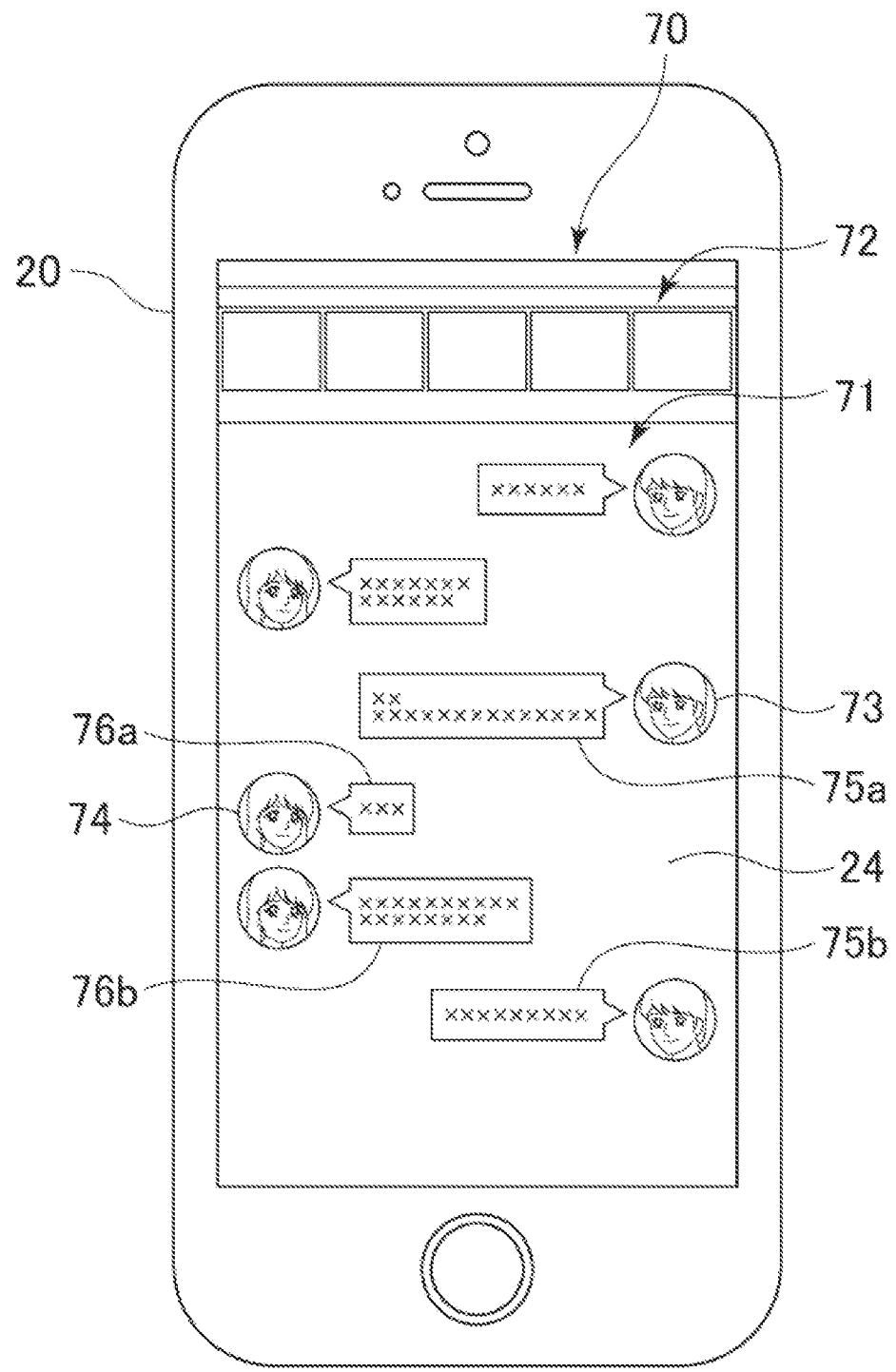
FIG. 7 shows an example of a display image in the chat mode according to an embodiment. The screen of FIG. 7 shows the message selected by the player.

The chat display image 70 in FIG. 6 includes, at the lower part of the chat display area 71, options 77 of the message for the player 5 to select. The player 5 is able to select one from among the displayed options 77. The selection is performed, for example, by touching with a finger an area on the display 24 where the option desired to be selected is displayed. Once the selection is made, a message 75*b* corresponding to the selected option is newly displayed in the chat display area 71 as a message from the player 5, as shown in FIG. 7.

Figure 8:
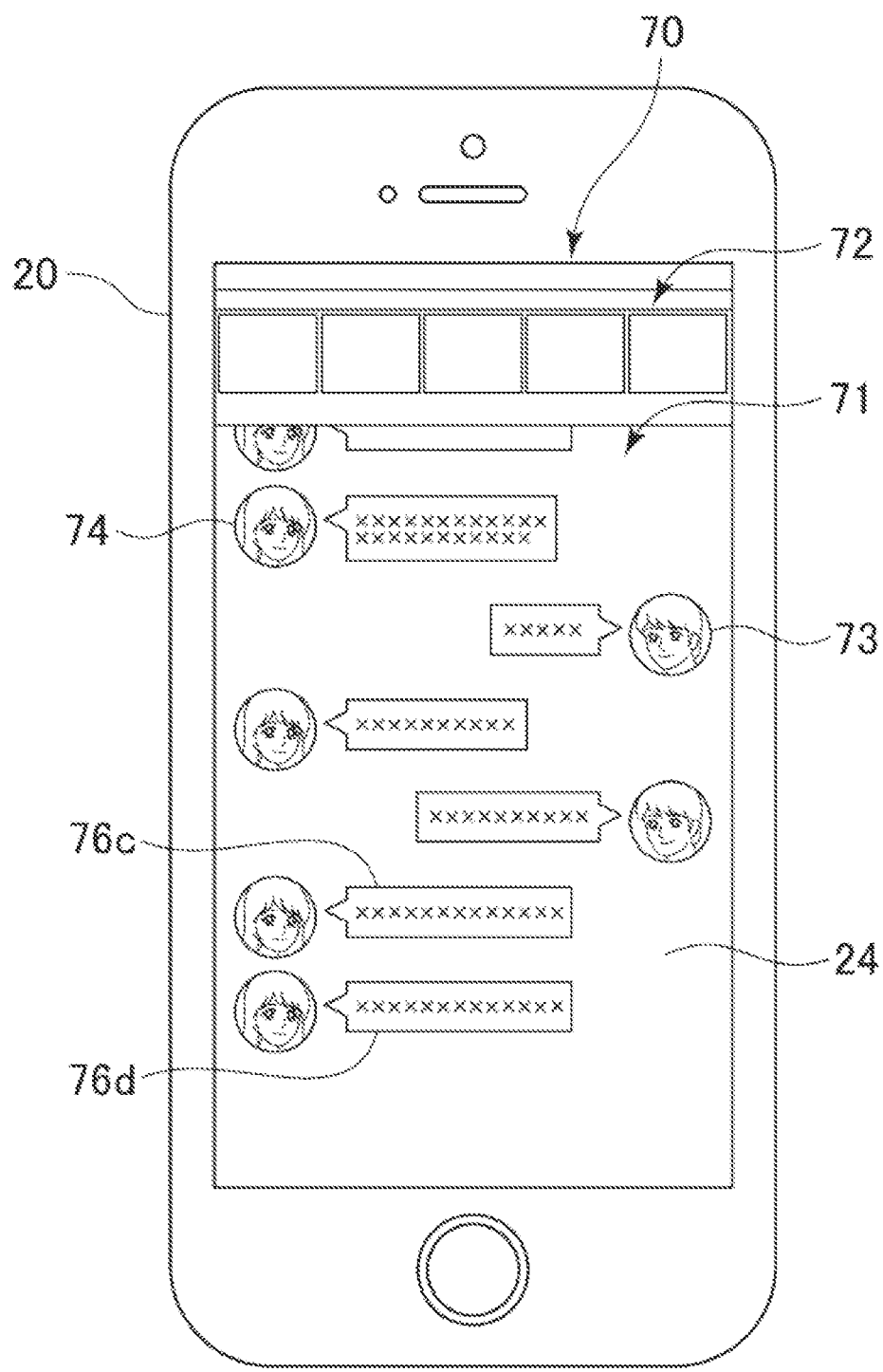
FIG. 8 shows an example of a display image in the chat mode according to an embodiment. The screen of FIG. 8 shows a message for prompting the player to switch to a VR mode, a message for selecting settings in the VR mode, and a message for selecting an item used in the VR mode.

In the course of a chat, messages 76*c* and 76*d* for prompting the player to select settings in the VR mode which is the second mode may be displayed as messages from the virtual character as shown in FIG. 8. The message 76*c* is a message for prompting the player 5 to select a scene in the VR mode, and the message 76*d* is a message for prompting the player 5 to select an item used by the virtual character in the VR mode (for example, clothes worn by the virtual character in the virtual space in the VR mode). In other words, the settings in the second mode may include a scene that prescribes the background in the VR mode, the item used by the virtual character in the VR mode, and other various settings. After the message 76*c* prompting the player 5 to select a scene is displayed, choices of the scene are displayed on the display 24. The player 5 is able to select one scene that he/she likes from among these choices. After the message 76*d* prompting the player 5 to select an item is displayed, choices of the item are displayed on the display 24. The player 5 can select one item that he/she likes from among the choices. In the course of a chat, a message for prompting the player to switch to the second mode may be displayed as a message from the virtual character.

In step S13, it is determined whether the mode switch condition from the first mode to the second mode is satisfied or not. An example of the mode switch condition from the first mode to the second mode is that a predetermined duration of time (for example, one minute) has elapsed from the start of the chat mode. The elapsed time from the start of chat mode is measured using, for example, a system clock. The process returns to step S12 and the chat is continued until it is determined that the mode switch condition is satisfied. When it is determined that the mode switch condition is satisfied, the chat process proceeds to step S14.

Figure 9:
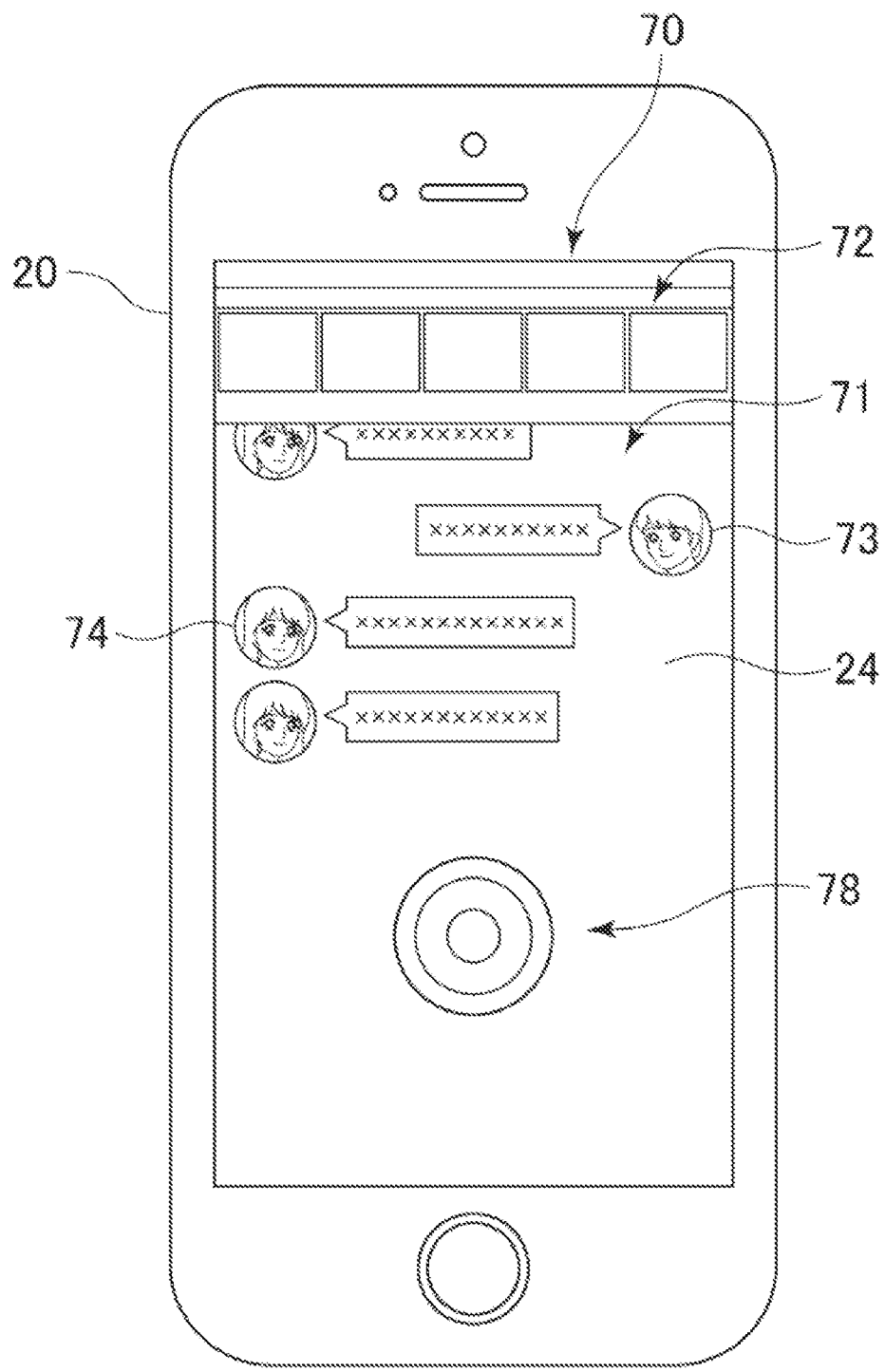
FIG. 9 shows an example of a display image in the chat mode according to an embodiment. The screen of FIG. 9 shows a switch start object.

In step S14, the switch start object 78 is displayed on the display 24, and the chat process proceeds to step S15. As shown in FIG. 9, the switch start object 78 is displayed as, for example, an object having a circular profile in the chat display area 71. It is also possible that the switch start object 78 is displayed in areas other than the chat display area 71, such as the menu area 72. In this case, the player 5 can select the switch start object 78 displayed in the menu area 72 to switch to the VR mode. The switch start object 78 may be displayed in the menu area 72 in a selectable manner even when the mode switch condition is not satisfied. This allows the player 5 to switch to the VR mode at a desired timing even when the mode switch condition is not satisfied. When it is confirmed that the switch start object is selected in step S15, the chat process proceeds to step S16. When the selection of the switch start object is not confirmed even after a predetermined duration of time (for example, 10 seconds) has elapsed since the switch start object is displayed, it is determined that the switch start object has not been selected and the chat process is terminated. Alternatively, the process may return to step S12 and a process for resuming the chat may be performed when it is determined that the switch start object has not been selected. Whether the switch start object is selected or not may be determined based on an operation performed on the touch-screen panel 24*b*. For example, when an operation (for example, a tap operation) to touch the touch-screen panel 24*b* at a position overlapping the display area of the switch start object is detected via a detection signal of the touch-screen panel 24*b*, it is determined that the switch start object is selected.

In step S16, a switch process to switch to the VR mode, which is the second mode, is started. When the switch process is started, the chat process is terminated.

The above chat process is executed by the chat mode execution unit 21*a*. The chat mode execution unit 21*a* is capable of executing the above-described chat process alone or in cooperation with other functions as appropriate. The chat process may be performed using, as required, data stored in a storage other than the storage 27, detection information obtained by various sensors, and any other data, in addition to the data stored in the storage 27.

Figure 10:
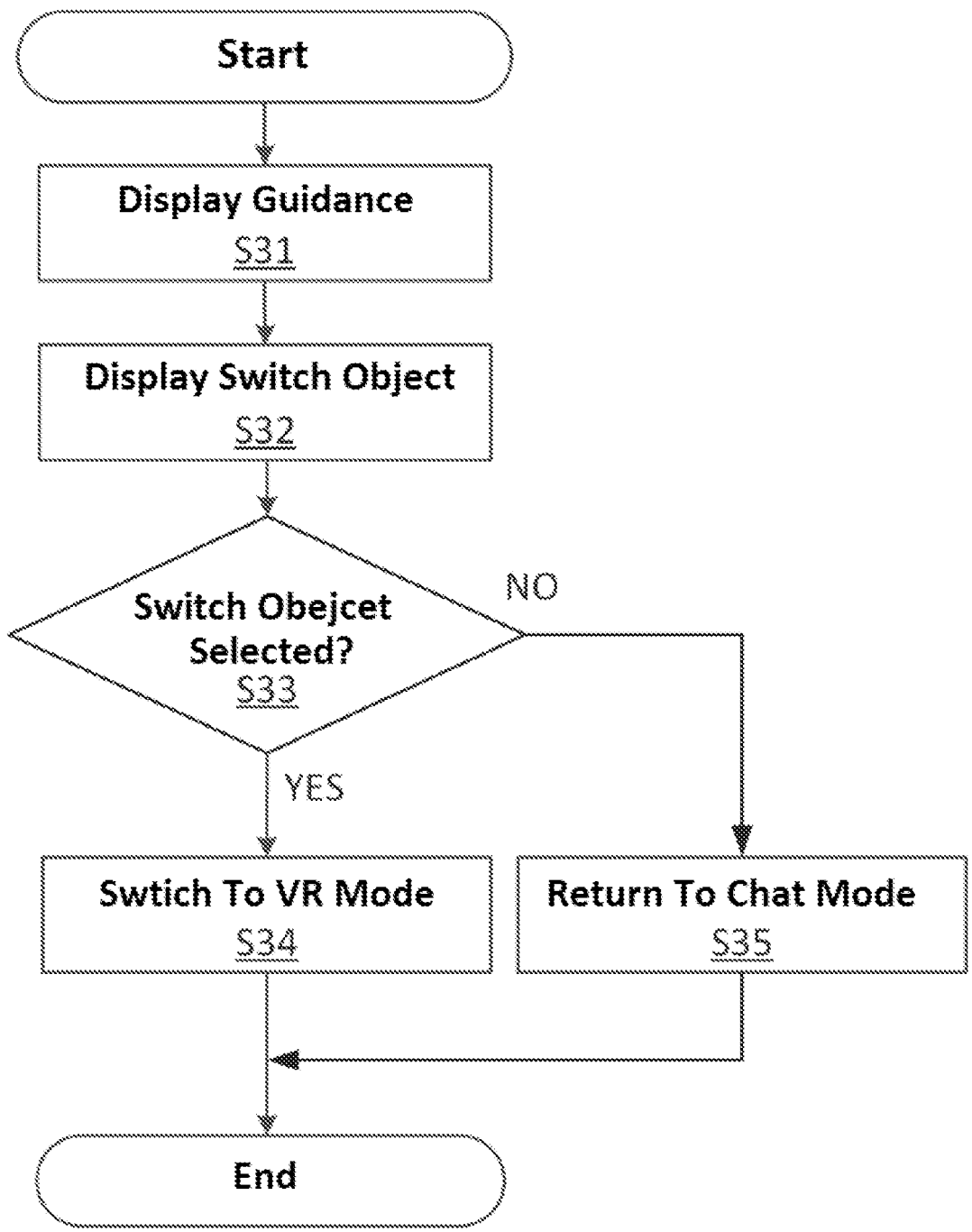
FIG. 10 is a flowchart of a mode switch process according to an embodiment.
Figure 11:
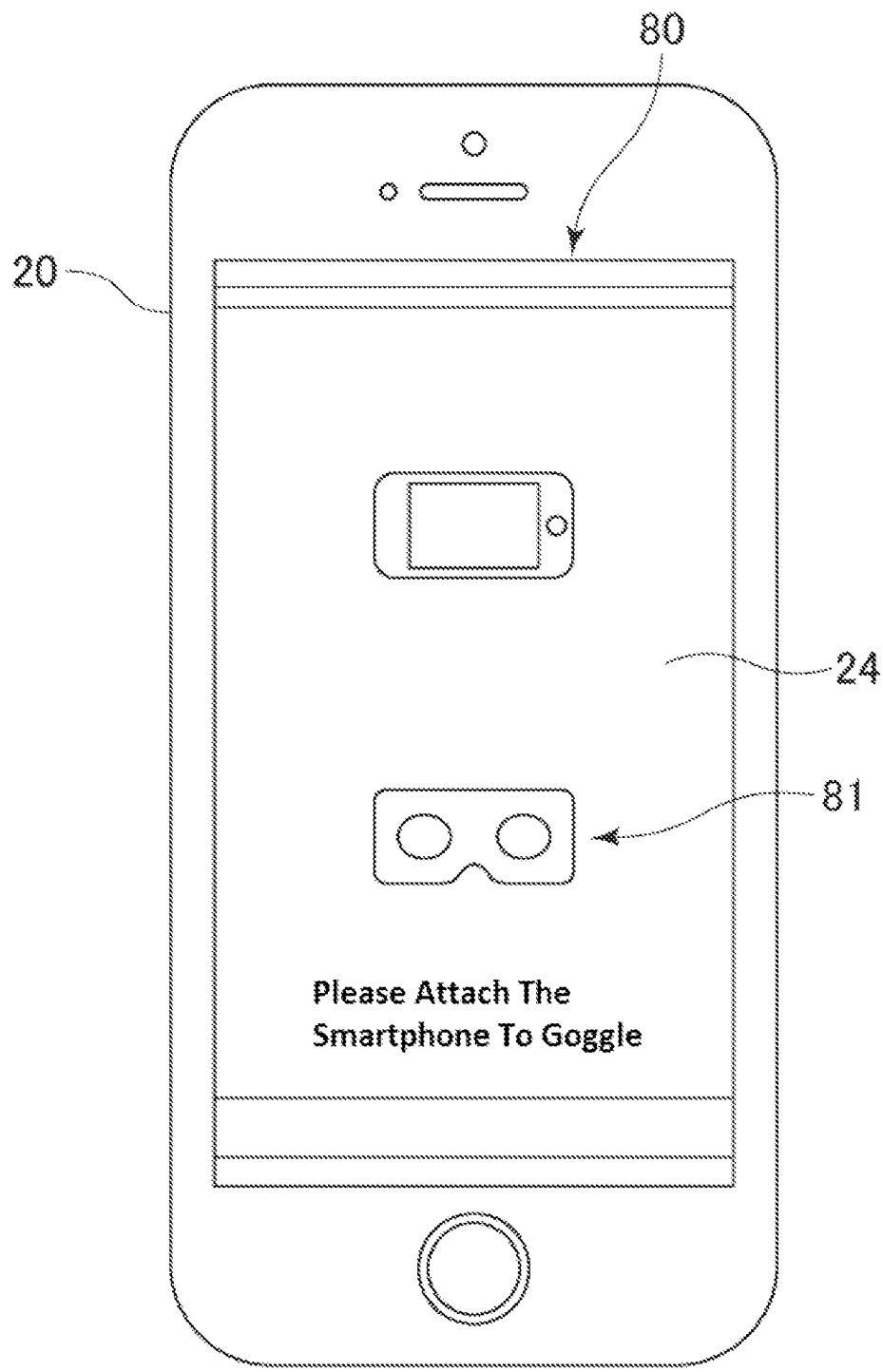
FIG. 11 shows an example of an image displayed in the mode switch process according to an embodiment. The screen of FIG. 9*a* shows a guidance for prompting the player to attach a display to an attachment.
Figure 12:
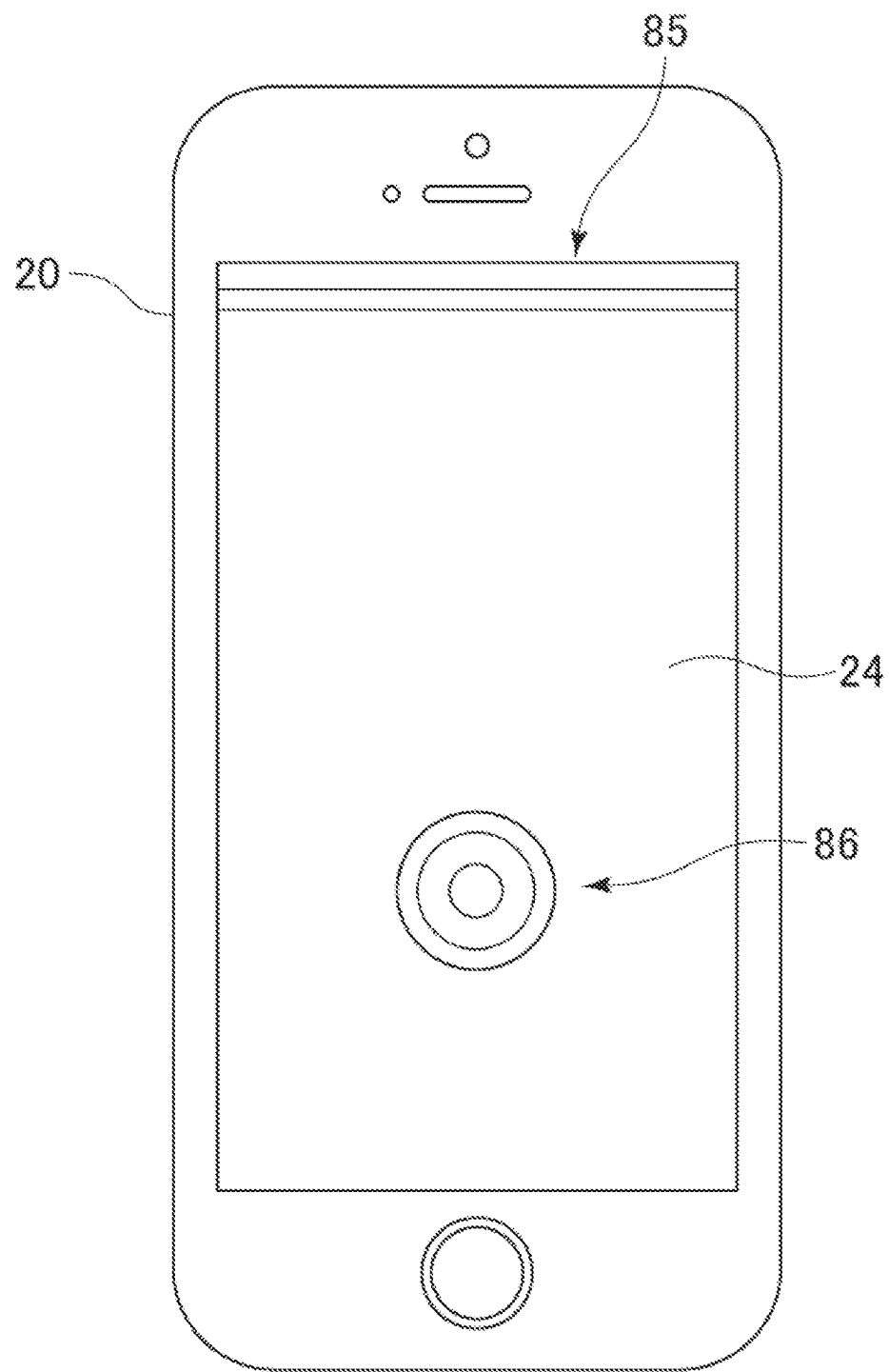
FIG. 12 shows an example of an image displayed in the switch process according to an embodiment. The screen of FIG. 12 shows a switch object.

The mode switch process from the chat mode as the first mode to the VR mode as the second mode will be now described with reference to FIGS. 10 to 12. FIG. 10 is a flowchart of the mode switch process according to an embodiment.

When the switch process is started, a guidance that prompts the player to wear the HMD 10 is displayed on the display 24 of the information processing device 20 in step S31. FIG. 11 shows a guidance display image 80 which is an example of the guidance display image including the above guidance. The guidance display image 80 may include a guidance prompting the player to attach the information processing device 20 to the attachment 11, a guidance prompting the player to wear the HMD 10 on the head, and any other various guidances necessary for starting the VR mode. The guidance display image 80 shown in FIG. 11 includes a guidance 81 prompting the player to attach the information processing device 20 to the attachment 11. This guidance may include instructions for attaching the information processing device 20 to the attachment 11. When a predetermined time has elapsed after displaying the guidance, the mode switch process proceeds to step S32.

In step S32, the switch object is displayed on the display 24. An example of the switch process image including the switch object is shown in FIG. 12. The switch process image 85 shown in FIG. 12 includes a switch object 86. The switch process image 85 may be displayed as a stereoscopic image. In one embodiment, the images displayed on the display 24 are switched from non-stereoscopic images to stereoscopic images at the start of the mode switch process or at a predetermined timing after the start of the mode switch process. For example, the images displayed in the chat mode are non-stereoscopic, and the images displayed after the switch process has started are stereoscopic.

Next, in step S33, it is determined whether selection of the switch object 86 is completed. When it is determined that selection of the switch object 86 is completed, the switch to the VR mode is confirmed and the mode switch process proceeds to step S34. The switch object 86 is selected, for example, by the player 5 gazing at the switch object 86 for a predetermined duration of time. Therefore, in order to select the switch object 86 in this state, the player 5 is required to wear the HMD 10. In one embodiment, whether the selection of the switch object 86 is completed is determined based on whether the gazing point calculated based on the detection signal from the HMD 10 is situated on the switch object 86 for a predetermined amount of time or more. The gazing point may be calculated based on information obtained by the sensor unit 25 provided in the HMD 10 as described above. The above determination can be made by measuring a gazing time for which the gazing point stays on the switch object 86 using the system clock and determining whether the measured gazing time has reached the predetermined amount of time. For example, when the gazing time reaches the predetermined amount of time, it is determined that selection of the switch object 86 is completed, and the mode switch process proceeds to step S34. When selection of the switch object 86 is completed, the switch object 86 may be displayed in a different manner. For example, the shape, color, or other external properties of the switch object may be changed in response to completion of selection of the switch object 86. When the external properties of the switch object 86 are changed, the player 5 should recognize that the mode is being switched to the VR mode, which is the second mode. It is also possible that when selection of the switch object 86 is completed, the player 5 is notified of the switch to the VR mode by means other than change of the external properties of the switch object 86. When completion of the selection of the switch object 86 is not detected even after a predetermined amount of time has elapsed since the switch object 86 is displayed, it is determined that the selection of the switch object 86 has not been completed, and the mode switch process proceeds to step S35.

After the switch to the VR more is confirmed, the VR mode, which is the second mode, is started in step S34. Processes performed in the VR mode will be described later in detail.

When the switch to the VR mode has not been selected, a process for returning to the chat mode is started in step S35. When the returning process to the chat mode is completed, the chat mode is resumed. In the resumed chat mode, a message from the virtual character based on the fact that the switch to the VR mode was not performed may be displayed.

The mode switch process described above is executed by the switch processing unit 21*b*. The switch processing unit 21*b* is capable of executing the mode switch process alone or in cooperation with other functions as needed.

Next, a VR process in the VR mode will be described with reference to FIGS. 13 to 14.

Figure 13:
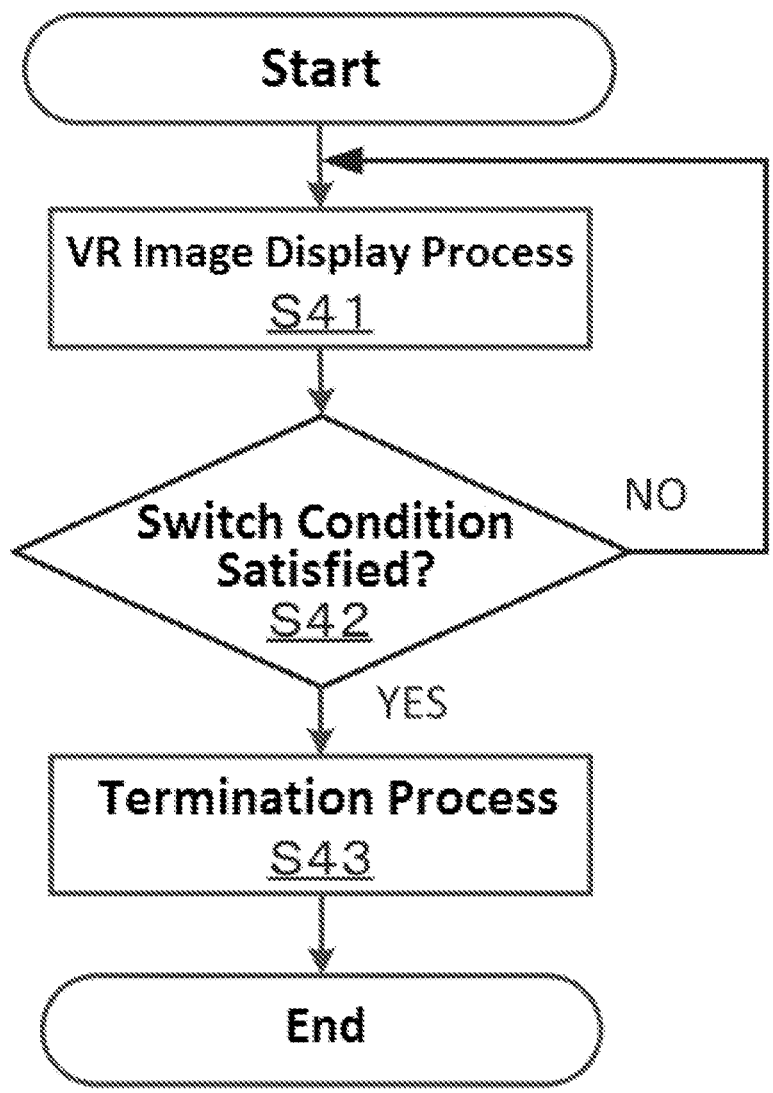
FIG. 13 is a flowchart of a process in the VR mode according to an embodiment.
Figure 14:
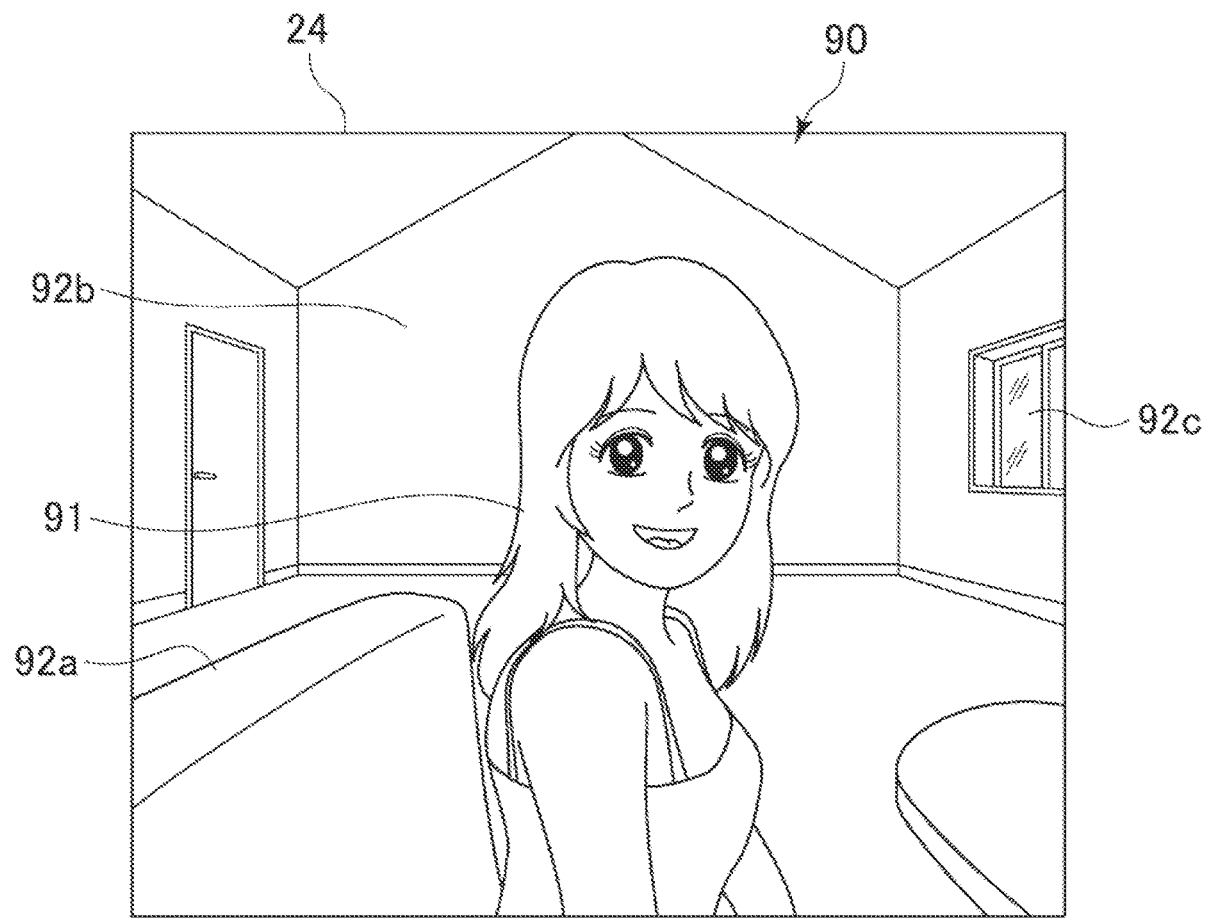
FIG. 14 shows an example of an image displayed in the VR mode according to an embodiment.

FIG. 13 is a flowchart showing the flow of the VR process in the VR mode in one embodiment, and FIG. 14 shows an example of a display image in the VR mode. As described above, in order to select the switch object 86 in the mode switch process, the player 5 wears the HMD 10. It is assumed that the HMD 10 is mounted on the head of the player 5 at the start of the VR mode.

When the VR mode is started, the VR process proceeds to step S41 where image information of the virtual space corresponding to the scenario is generated, and an image corresponding to the image information is output to the display 24. The scenario used in step S41 may be either specified in accordance with the game processing program and independently of the selection of the player 5 or specified based on the selection of the player 5. The specified scenario includes, for example, a plurality of events defined in a tree structure. The events included in the specified scenario and the tree structure thereof may be specified by referring to the scenario data 28*c*. The step S41 may begin with generation of image information corresponding to a start event at the root node of the tree structure. After the image information corresponding to the start event is displayed, a next node is selected depending on a branch condition, and image information corresponding to the event corresponding to the selected node is displayed.

The image information of each event is generated by referring to, for example, the event data 28*d*. The image information of each event may include an image of a virtual character and an object constituting a background. FIG. 14 shows an example of a VR image displayed on the display 24 based on the image information generated in the VR mode. The VR image 90 shown in FIG. 14 includes a virtual character image 91 representing the virtual character, images 92*a* to 92*c* representing objects constituting the background, and other images of various objects. The VR image 90 is an image corresponding to a region of the virtual space. The region of the virtual space corresponding to the VR image 90 may be specified as a region determined by, for example, an angle of view based on the position and/or the orientation of the HMD 10. The image data 28*a* is used to generate the image information. The VR image 90 and other images displayed in the VR mode are displayed as stereoscopic images.

The virtual character image 91 is able to perform an action specified by the event data 28*d* in the virtual space. For example, the action that the virtual character image 91 performs may include talking to the player 5 (toward the position of the player 5 in the virtual space), traveling in the virtual space, picking up an object placed in the virtual space, and any other various actions in the virtual space.

When movement of the head of the player 5 is detected by the sensor unit 25 of the HMD 10 while the VR image 90 is displayed on the display 24, an action of the player 5 is specified based on the detected movement of the head. Then, an action (reaction) of the virtual character responsive to the specified action of the player 5 is determined. Subsequently image information of the virtual character image 91 that performs the determined action is generated. The image information generated in this way is output to the display 24. For example, when a nodding motion of the player 5 is detected, image information of the virtual character image 91 reacting to the nodding motion of the player 5 is generated, and the image information is displayed on the display 24. In this manner, in the VR mode, interaction between the player 5 and the virtual character is realized using the stereoscopic image of the virtual character.

In step S42, it is determined whether or not the termination condition for terminating the VR image display process is satisfied. When it is determined that the termination condition is not satisfied, the VR process returns to step S41 to continue the VR image display process. When it is determined that the termination condition is satisfied, the VR process proceeds to step S43.

In step S43, the termination process of the VR mode is performed. The termination process may include displaying on the display 24 a guidance for prompting the player to remove the information processing device 20 from the attachment 11, and displaying a login screen to log in to the chat mode which is the first mode.

Figure 15:
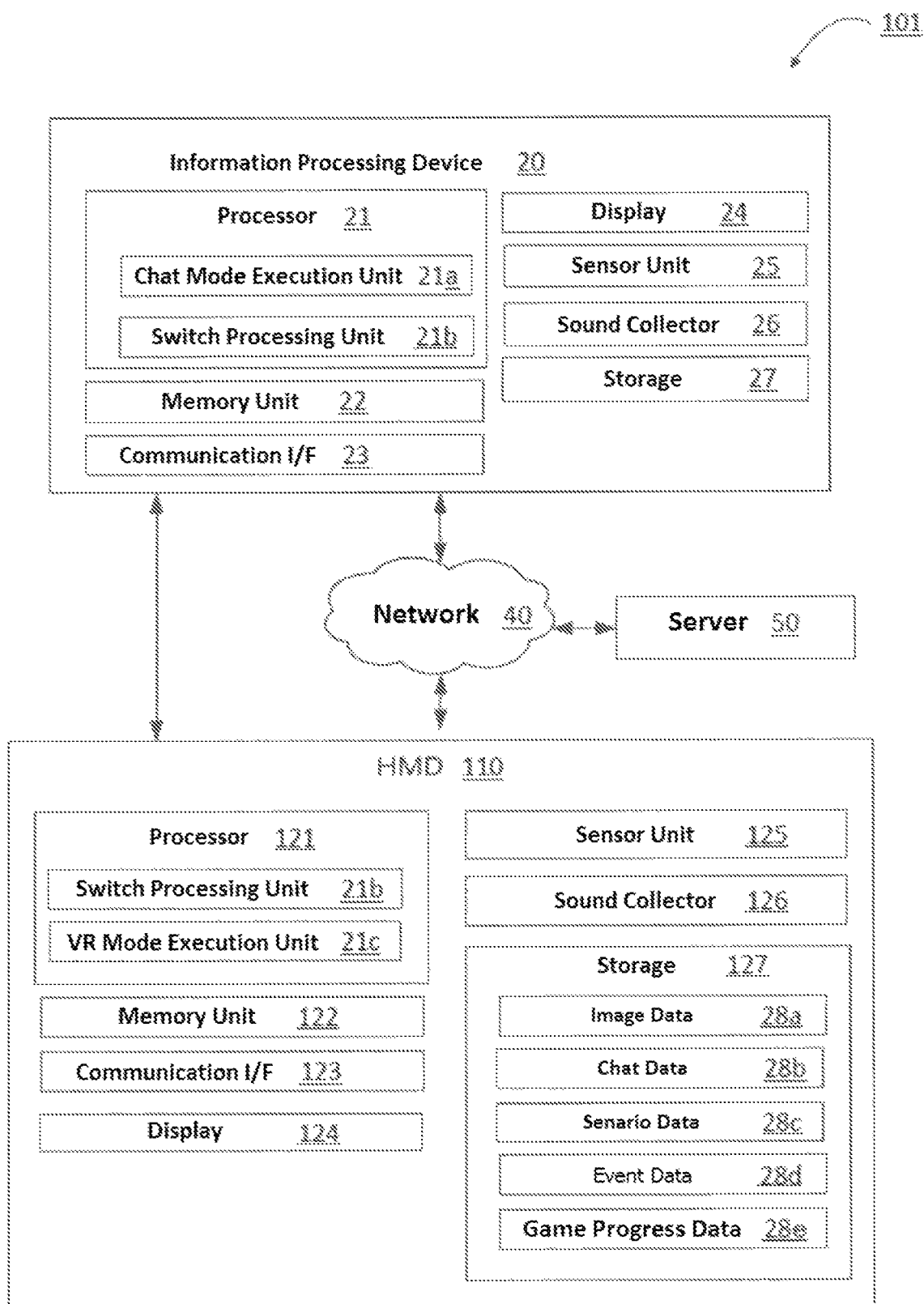
FIG. 15 is a block diagram illustrating a game processing system according to another embodiment.

The game processing system according to another embodiment will be described with reference to FIG. 15. FIG. 15 is a block diagram illustrating a game processing system 101 according to another embodiment. The game processing system 101 includes the information processing device 20 and the HMD 110. The game processing system 101 is different from the game processing system 1 in that the VR mode can be provided without attaching the information processing device 20 to the HMD 110. Hereinafter, the game processing system 101 will be described focusing on the differences from the game processing system 1.

The HMD 110, the information processing device 20, and the server 50 are communicably interconnected over the network 40. The HMD 110 and the information processing device 20 may be connected so as to communicate with each other according to a short-range wireless system such as Bluetooth (registered trademark) without using the network 40. The HMD 110 is different from the HMD 10 of the game processing system 1 in that the VR mode can be provided even if the information processing device 20 is not mounted.

The HMD 110 includes a computer processor 121, a memory unit 122, a communication I/F 123, a display 124, a sensor unit 125, a sound collector 126, and a storage 127. The computer processor 121, the memory unit 122, the communication I/F 123, the display 124, the sensor unit 125, the sound collector 126, and the storage 127 are configured similarly to the computer processor 21, the memory 22, the communication I/F 23, the display 24, the sensor unit 25, the sound collector 26, and the storage 27 of the information processing device 20, respectively. However, the display 124 may not have a touch-screen panel.

The functions of the chat mode execution unit 21a, the switch processing unit 21b, and the VR mode execution unit 21c are distributed between the information processing device 20 and the HMD 110. Specifically, the function of the chat mode execution unit 21a is realized in the information processing device 20, and the function of the VR mode execution unit 21c is realized in the HMD 110. A part of the function of the switch processing unit 21b is realized by the information processing device 20, and the rest is realized in the HMD 110.

When starting the game in the game processing system 101, the player 5 uses the information processing device 20 to start the chat mode. The process for executing the chat mode is performed by the chat mode execution unit 21a of the information processing device 20.

When the mode switch condition is satisfied in the chat mode and the switch start object is selected, the mode switch process for switching to the VR mode is started. The mode switch process is performed by the switch processing unit 21b. In the mode switch process, displaying the guidance corresponding to the above-described step S31 is performed in the information processing device 20. For example, a guidance prompting the player to put on the HMD 110 is displayed on the display 24 of the information processing device 20. Displaying the switch object 86 corresponding to step S32 and subsequent processes are executed in the HMD 110.

When the VR mode is started, the processing of the VR mode is performed by the VR mode execution unit 21c of the HMD 110.

The above embodiment may produce the following advantageous effects. Specifically, in the game processing systems 1, 101, the VR mode using the HMD 10 is performed after the switch process from the chat mode to the VR mode. Therefore, the player 5 can start the game with a chat, when it is not necessary to mount the HMD 10 on his/her head. In the course of progress of the game in the chat mode, the player 5 is prompted to put on the HMD 10. Likewise, in the game processing system 101, the player 5 is prompted to put on the HMD 110 in the course of progress of the game in the chat mode.

In the game processing systems 1, 101, the message for prompting the player to switch to the VR mode is displayed in the chat mode as a message from a virtual character, and therefore, the player is naturally prompted to switch to the VR mode through the interaction with the virtual character in the chat mode.

In the game processing systems 1, 101, the messages 76c, 76d for prompting the player to select settings in the VR mode are displayed in the chat mode as a message from a virtual character, and therefore, the player is motivated to switch to the VR mode through the interaction with the virtual character in the chat mode.

In the game processing systems 1, 101, the mode switch process is started in accordance with progress of the chat with the virtual character in the chat mode (for example, in response to display of a message corresponding to a terminal node in the defined tree structure), and therefore, the player is naturally prompted to switch to the VR mode through the interaction with the virtual character in the chat mode.

In the game processing systems 1, 101, the switch start object 78 is displayed on the information processing device 20 in the chat mode, thereby to prompt the player to switch from the chat mode to the VR mode.

In the game processing systems 1, 101, the player who has selected switch to the VR mode is provided with a guidance that prompts the player to put on the HMD 10, 110, and therefore, the player is prompted to prepare for the switch to the VR mode.

In the game processing systems 1, 101, the switch to the VR mode is performed when the switch object 86 is gazed at, and therefore, the player can be motivated to put on the HMD 10, 110 on his/her head to gaze at the switch object 86.

In the game processing systems 1, 101, a login screen to log in to the chat mode is displayed on the information processing device 20 when the VR mode is terminated, and therefore, the player can restart the game in the chat mode after terminating the VR mode.

In the game processing systems 1, 101, the player can experience an interaction in the chat mode through the information processing device 20 detached from the attachment 11 and experience an interaction in the VR mode through the information processing device 20 attached to the attachment 11.

In the game processing systems 1, 101, the player can interact with a virtual character by moving his/her head in the VR mode. Thus, a natural interaction with the virtual character can be realized.

In the game processing systems 1, 101, the player can interact with a virtual character displayed as a stereoscopic image in the VR mode, and therefore, the player can obtain a strong sense of immersion.

In the game processing systems 1, 101, the switch from the first mode to the second mode is started by selecting the switch start object 78 and completed by selecting the switch object 86 different from the switch start object 78. The switch start object 78 may be selected based on the detection information obtained by the information processing device 20 or any other devices (for example, a controller other than the information processing device 20) used to advance the game in the first mode, and the switch object 86 may be selected based on the detection information obtained by the HMD 10, 110 or any other devices used to advance the game in the second mode. In this way, the switch start object 78 can be easily selected during play of the game in the first mode, and the switch object 86 can be easily selected when the player is prepared for play of the game in the second mode. Thus, smooth switch from the first mode to the second mode is possible.

Embodiments of the present invention are not limited to the above embodiments but various modifications are possible within a spirit of the invention. For example, some or all of the functions executed by the computer processor 21 and the computer processor 121 may be realized by a computer processor which is not shown in the above-mentioned embodiment without departing from the scope of the invention. For example, the game processing system 1 and the game processing system 101 may include a game machine that executes at least a part of the game processing program. Some of the functions realized by processing of the computer processor 21 or the computer processor 121 may be realized by processing performed by the game machine.

Embodiments of the disclosure may include various devices, devices, and electronic components other than those described above. For example, in addition to the information processing device 20 and the HMD 10, 110, the game processing system 1 and the game processing system 101 may be provided with a control device for receiving operations of the player 5. The game processing system 1 and the game processing system 101 may detect operations of the player 5 via the control device and perform the processing of the game in accordance with the detected operations.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. A game processing system for processing a game having a first mode and a second mode, the system comprising one or more computer processors configured to execute computer readable instructions to:
    provide, in the first mode, an interaction with a virtual character in accordance with first detection information obtained by an information processing device not mounted on a head of a player;
    start a switch process for switching the game from the first mode to the second mode in response to selection of a switch start object displayed on the information processing device in the first mode;
    in the switch process, start the second mode if a switch object is selected by a player of the game gazing at the switch object during a predetermined period of time since the switch object is displayed, and return to the first mode if the switch object is not selected during the predetermined period of time; and
    provide, in the second mode after the switch process, an interaction with the virtual character in accordance with second detection information obtained by a head mounted display mounted on the head of the player.

2. The game processing system of claim 1, wherein the interaction with the virtual character in the first mode includes a prompting interaction through which the virtual character prompts the player to switch the game to the second mode.

3. The game processing system of claim 1, wherein the interaction with the virtual character in the first mode includes a setting interaction for determining a setting of the second mode.

4. The game processing system of claim 1, wherein the switch process is started in response to the interaction with the virtual character in the first mode.

5. The game processing system of claim 1, wherein said one or more computer processors is configured to execute computer readable instructions further to:
    switch, either at a start of the switch process or after a start of the switch process, an image displayed on the information processing device as a non-stereoscopic image to a stereoscopic image;
    display a switch process image including the switch object as the stereoscopic image;
    complete the switch process upon selection of the switch object by the player gazing at the switch object; and
    provide the interaction with the virtual character in the second mode upon completion of the switch process.

6. The game processing system of claim 1, wherein the one or more computer processors is configured to display, in response to selection of the switch start object, a guidance for prompting the player to put on the head mounted display on the information processing device.

7. The game processing system of claim 1, wherein the one or more computer processors is configured to cause the information processing device to display a login screen to start the first mode after the second mode is terminated.

8. The game processing system of claim 1, wherein the head mounted display includes an attachment to be fitted on the head of the player and the information processing device mounted on the attachment.

9. The game processing system of claim 1, wherein, in the second mode, head tracking information for determining at least one of a position and an orientation of the head of the player is calculated based on the second detection information, and the interaction with the virtual character is provided in accordance with the head tracking information.

10. The game processing system of claim 1, wherein, in the second mode, the virtual character is displayed as a stereoscopic image, whereas in the first mode, the virtual character is displayed as a non-stereoscopic image.

11. The game processing system of claim 1, wherein the game is started in the first mode.

12. The game processing system of claim 1, wherein points of the player acquired in the first mode is carried over to the second mode.

13. The game processing system of claim 1, wherein the first mode is a non-VR mode and the second mode is a VR mode.

14. The game processing system of claim 1, wherein a common game content is used both in the first mode and the second mode.

15. The game processing system of claim 14, wherein a game parameter associated with the common game content is changed in the first mode.

16. The game processing system of claim 15, wherein the game parameter associated with the common game content is further changed in the second mode.

17. The game processing system of claim 16, wherein the game parameter associated with the common game content is further changed in the switch process.

18. The game processing system of claim 17, wherein the game parameter associated with the common game content is further changed in another switch process for switching from the second mode to the first mode.

19. A method of processing a game having a first mode and a second mode with one or more computer processors executing computer readable instructions, the method comprising:
    providing, in the first mode, an interaction with a virtual character in accordance with first detection information obtained by an information processing device not mounted on a head of a player;
    starting a switch process for switching the game from the first mode to the second mode in response to selection of a switch start object displayed on the information processing device in the first mode;

in the switch process, starting the second mode if a switch object is selected by a player of the game gazing at the switch object during a predetermined period of time since the switch object is displayed, and return to the first mode if the switch object is not selected during the predetermined period of time; and providing, in the second mode after the switch process, an interaction with the virtual character in accordance with second detection information obtained by a head mounted display mounted on the head of the player.

20. A non-transitory computer-readable storage medium storing a game processing program to be executed by one or more computer processors for processing a game having a first mode and a second mode, wherein the game processing program causes the one or more computer processors to:

provide, in the first mode, an interaction with a virtual character in accordance with first detection information obtained by an information processing device not mounted on a head of a player;

start a switch process for switching the game from the first mode to the second mode in response to selection of a switch start object displayed on the information processing device in the first mode;

in the switch process, start the second mode if a switch object is selected by a player of the game gazing at the switch object during a predetermined period of time since the switch object is displayed, and return to the first mode if the switch object is not selected during the predetermined period of time; and provide, in the second mode after the switch process, an interaction with the virtual character in accordance with second detection information obtained by a head mounted display mounted on the head of the player.

* * * * *